US007359587B2

(12) United States Patent
Beausoleil et al.

(10) Patent No.: US 7,359,587 B2
(45) Date of Patent: Apr. 15, 2008

(54) PHOTONIC INTERCONNECTIONS THAT INCLUDE OPTICAL TRANSMISSION PATHS FOR TRANSMITTING OPTICAL SIGNALS

(75) Inventors: Ray Beausoleil, Redmond, WA (US); Wei Wu, Mountain View, CA (US); Shih-Yuan Wang, Palo Alto, CA (US); Sean Spillane, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 173 days.

(21) Appl. No.: 11/264,210

(22) Filed: Nov. 1, 2005

(65) Prior Publication Data

US 2006/0056758 A1    Mar. 16, 2006

Related U.S. Application Data

(63) Continuation-in-part of application No. 10/684,278, filed on Oct. 11, 2003.

(51) Int. Cl.
*G02B 6/12* (2006.01)
*G02B 6/28* (2006.01)
*G02B 6/35* (2006.01)

(52) U.S. Cl. .................... 385/14; 385/16; 385/24; 385/37; 385/129; 385/130

(58) Field of Classification Search ............ None
See application file for complete search history.

(56) References Cited

U.S. PATENT DOCUMENTS

| 6,738,551 | B2* | 5/2004 | Noda et al. ............. 385/130 |
| 2005/0053326 | A1* | 3/2005 | Toney ................. 385/24 |
| 2007/0053692 | A1* | 3/2007 | Hoshida et al. ........... 398/97 |

\* cited by examiner

Primary Examiner—Michelle Connelly-Cushwa

(57) ABSTRACT

Various embodiments of the present invention are directed to photonic interconnection architectures that provide high-speed interconnections of microscale or nanoscale devices. In one embodiment of the present invention, a photonic interconnection for interconnecting and synchronizing operation of components within a computing device comprises an optical transmission path for transmitting a number of independent frequency channels within an optical signal provided by an optical signal source. The photonic crystal may include one or more filters located near the waveguide for extracting specific frequency channels transmitted by the waveguide, the frequency channel including one or more frequency channels carrying a clock signal. One or more photodetectors positioned near the one or more filters convert the extracted frequency channels into electrical signals for use by one or more components of the computing device, the electrical signals including one or more clock signals for synchronizing operation of the one or more components.

22 Claims, 20 Drawing Sheets

PHOTONIC INTERCONNECTIONS THAT INCLUDE OPTICAL TRANSMISSION PATHS FOR TRANSMITTING OPTICAL SIGNALS

CROSS-REFERENCE TO RELATED APPLICATION

This application is a continuation-in-part of U.S. application Ser. No. 10/684,278, filed Oct. 11, 2003, which was published as U.S. Publication No. 2005/0078902, published Apr. 14, 2005.

TECHNICAL FIELD

The present invention relates to integrated circuit interconnections, and, in particular, to photonic interconnections that include optical transmission paths for transmitting data and clock signals through an optical medium within a computing device.

BACKGROUND OF THE INVENTION

Recent developments in integrated circuit ("IC") technology have shown remarkable promise in reducing the size of logic and memory circuits from microscale dimensions to nanoscale dimensions. Nanoscale electrical circuits, also called "nanoelectronic tiles," can be electronically interconnected to configure larger circuit elements called "mosaics." As a result, it may be assumed that IC component density can be significantly increased by employing mosaics of nanoelectronic tiles, because nanoelectronic tiles occupy less surface area than microscale equivalent IC components. However, nanoelectronic tiles are subject to many of the same limitations associated with microscale circuits. For example, nanoelectronic tiles are subject to Rent's Rule that relates the number of electrical interconnections or pins, $N_p$, to the number of logic gates, $N_g$, as follows:

$$N_p = \kappa N_g^\gamma$$

where proportionality constant, $\kappa$, and exponent $\gamma$ are constants that depend on architecture and implementation of the logic circuit.

In most microprocessor architectures, $\kappa$ typically ranges between 1 and 2, and $\gamma$ typically ranges between 0.5 and 0.6. According to Rent's rule, as the number of logic gates in an IC increases, the number of electrical interconnections also increases.

In addition, on chip electrical interconnections interconnecting nanoelectronic tiles, such as a multiplexer/demultiplexer ("MUX/DEMUX"), are approaching the fundamental physical limits of the information-carrying capacity of metal signal lines. For example, FIG. 1 illustrates an exemplary processor/memory interconnection architecture comprised of nanoelectronic tile components. In FIG. 1, central processing unit ("CPU") 110 retrieves data stored in a particular location in random access memory ("RAM") 130-132 by providing a logical address, that identifies the particular location in RAM 130-132, to multiplexer/demultiplexer ("MUX/DEMUX") 120 interconnecting CPU 110 to RAM 130-132. Hierarchically organized MUX/DEMUX stages may be employed to handle the large number of memory addresses located in RAM 130-132. As IC components, such as CPU 110 and RAM 130-132, and electronic interconnections, such as MUX/DEMUX 120, shrink from microscale dimensions to nanoscale dimensions, intrinsic capacitance of the electronic interconnections greatly increases and exceeds that of the nanoscale circuits. As a result, the relative amount of time needed to traverse the multiplexed circuit paths become too long to take full advantage of the high-speed performance offered by nanoscale components. Furthermore, the information carrying capacity of nanoscale electrical interconnections carrying data, power and clock signals is lower that microscale equivalents, and closely spaced signal lines cannot pass high speed signals without creating interference between adjacent signal lines, such as inducing currents in adjacent signal lines. Thus, even though the circuit density can be increased by decreasing the size of IC components, the number of transistors that can be reached in one clock cycle of a clock signal may shrink from $20 \times 10^6$ to less than $2 \times 10^6$.

Nanoscale implementations of computer components, therefore, may fail to take full advantage of the miniaturization offered by mosaics of nanoelectronic tiles, because of limitations in the degree to which the sizes of the interconnections can be decreased constrain the overall size decreases that can be achieved by using nanoscale components. The intrinsic capacitance of the interconnections can greatly exceed that of nanoelectronic tiles within a CPU or mosaics within RAM leading to an interconnection constraint on increasing signal speed. Manufacturers, designers, and users of nanoscale computing devices have recognized a need for an interconnection architecture that provides high-speed interconnections for distributing data, power, and clock signals without the size and signal-speed constraints inherent in currently employed, hierarchically interconnection stages.

SUMMARY OF THE INVENTION

Various embodiments of the present invention are directed to photonic interconnection architectures that provide high-speed interconnections of microscale or nanoscale devices. In one embodiment of the present invention, a photonic interconnection for interconnecting and synchronizing operation of components within a computing device comprises an optical transmission path for transmitting a number of independent frequency channels within an optical signal provided by an optical signal source. The photonic crystal may include one or more filters located near the waveguide for extracting specific frequency channels transmitted by the waveguide, the frequency channel including one or more frequency channels carrying a clock signal. One or more photodetectors positioned near the one or more filters convert the extracted frequency channels into electrical signals for use by one or more components of the computing device, the electrical signals including one or more clock signals for synchronizing operation of the one or more components.

DETRAILED DESCRIPTION OF THE INVENTION

Various embodiments of the present invention are directed to photonic interconnection architectures that provide high-speed interconnections between microscale or nanoscale devices. The photonic interconnection architectures include optical transmission paths for transmitting an optical signal from a signal source to one or more circuit units. A circuit unit can be a nanoelectronic tile, such as a nanoscale memory unit, a logic circuit, a sensor, or a mosaic comprising a combination of two or more memory units, logic circuits, or sensors. The optical signal can encode numerous, independently modulated frequency channels, each frequency channel assigned to a specific circuit unit so that each circuit unit receives only those frequency channels directed to the circuit unit. An external light source can be used to generate the optical signal, avoiding separate, circuit-unit-associated-light sources.

The present invention is described below in the subsections: (1) an overview of photonic crystals and waveguides, (2) an overview of clock signals, and (3) embodiments of the present invention.

An Overview of Photonic Crystals and Waveguides

Figure 2:
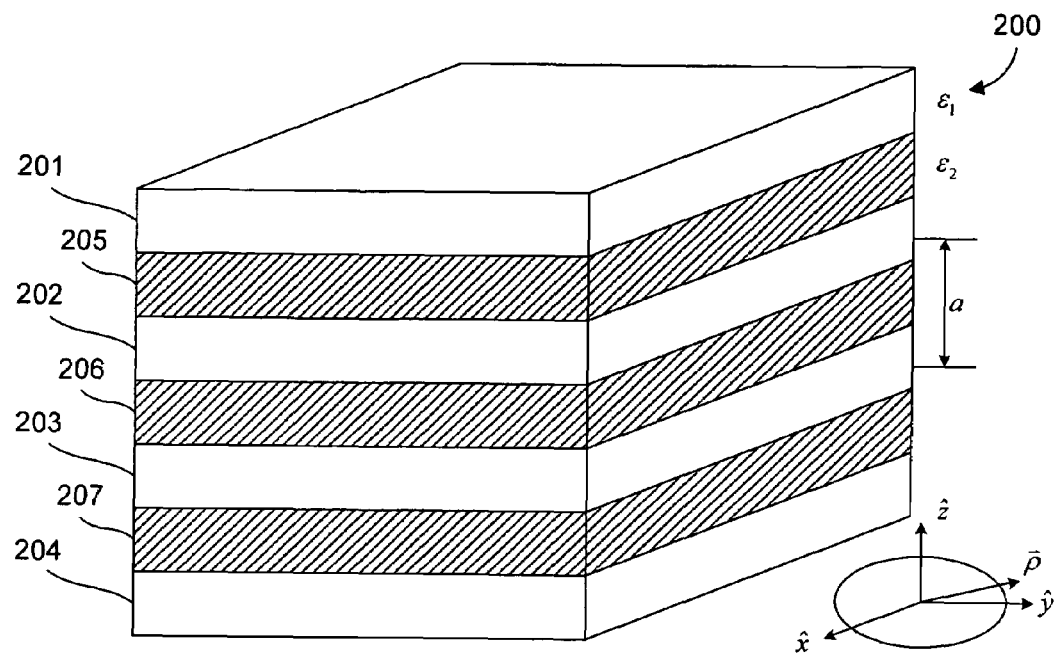
FIG. 2 illustrates an exemplary one-dimensional photonic crystal.
Figure 3:
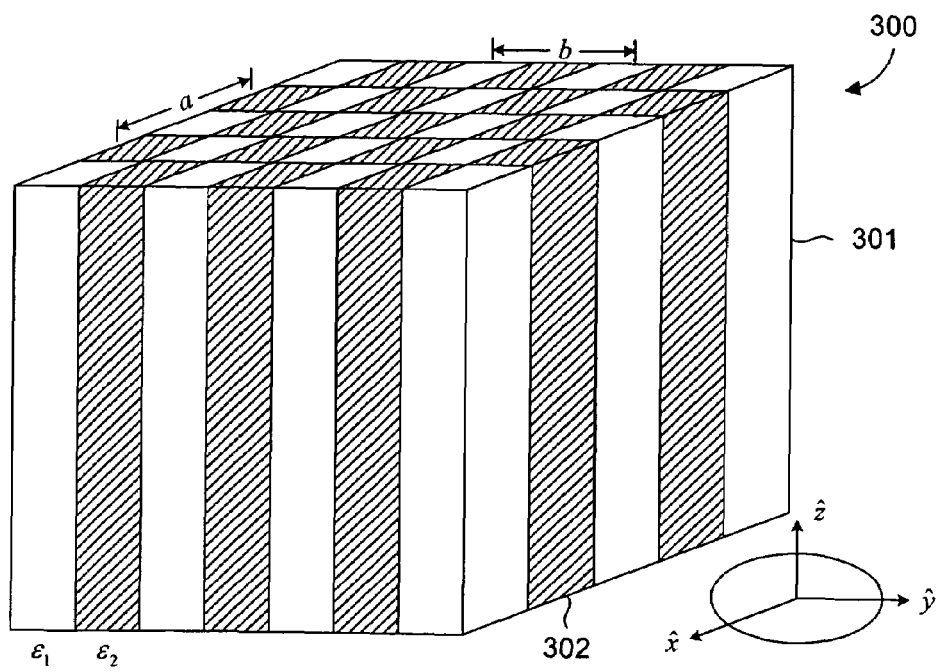
FIG. 3 illustrates an exemplary two-dimensional photonic crystal.

Photonic crystals are optical devices having a regular pattern of two or more different materials with dielectric properties that, when combined to together in a regular pattern, can modify the propagation characteristics of electromagnetic radiation ("ER"). FIGS. 2 and 3 illustrate two of many different possible patterns in which two different materials with different dielectric properties can be combined to form a photonic crystal. Photonic crystals are typically identified by the number of directions in which the dielectric pattern is periodic. For example, FIG. 2 illustrates an exemplary one-dimensional photonic crystal. In FIG. 2, photonic crystal 200 is composed of seven layers of two different dielectrics that alternate periodically in the z-direction. Unshaded layers 201-204 are composed of a first dielectric having a dielectric constant $\epsilon_1$, and hash-marked layers 205-207 are composed of a second dielectric having a different dielectric constant $\epsilon_2$. The layers are regularly spaced with the smallest repeat distance referred to as "lattice constant a." FIG. 3 illustrates an exemplary two-dimensional photonic crystal. Two-dimensional photonic crystal 300 comprises alternating layers of two different dielectrics, and is periodic in both the x-direction and y-direction with two lattice constants a and b. Unshaded regions, such as region 301, are comprised of a first dielectric having dielectric constant $\epsilon_1$, and hash-marked regions, such as region 302, are comprised of a second dielectric having a different dielectric constant $\epsilon_2$. Note that photonic crystals can also be fabricated with repeating patterns in three dimensions. Three-dimensional photonic crystals can be fabricated using spheres, tubes, or other solid shapes comprising a first dielectric embedded in a slab comprising a second dielectric.

ER propagating in a dielectric can be characterized by electromagnetic waves consisting of oscillating, orthogonal electric fields, $\vec{E}$, and magnetic fields, $\vec{H}$, and a direction of propagation, $\vec{k}$. The electric and magnetic fields are related by Maxwell's equations:

$$\nabla \cdot \vec{H}(\vec{r}, t) = 0 \qquad \text{Equation 1}$$

$$\nabla \cdot \varepsilon(\vec{r})\vec{E}(\vec{r}, t) = 0 \qquad \text{Equation 2}$$

$$\nabla \times \vec{E}(\vec{r}, t) = -\frac{\partial \vec{H}(\vec{r}, t)}{\partial t} \qquad \text{Equation 3}$$

-continued $$\nabla \times \vec{H}(\vec{r}, t) = \varepsilon(\vec{r}) \frac{\partial \vec{E}(\vec{r}, t)}{\partial t} \qquad \text{Equation 4}$$

where $\vec{r}$ is spatial displacement of an electromagnetic wave in the dielectric,
t is time,
$\epsilon(\vec{r})$ is a dielectric constant of the dielectric.

Because dielectrics do not include free charges or free currents, Equations 1-4 do not include a charge density term or a volume current density term. Equations 3 and 4, the curl equations, are linear differential equations. In both equations, the left sides express the dependence of a field on the independent spatial displacement $\vec{r}$, and the right sides express the dependence of a field on t. The only way for a differential quantity that varies with respect to $\vec{r}$ to remain equal to a quantity that varies with respect to t, is for the differential quantities to equal the same constant value. Both sides of Equations 3 and 4 are equal to a constant, and the method of separation of variables can be applied to obtain:

$$\vec{H}(\vec{r},t) = \vec{H}(\vec{r}) \exp(i\omega t)$$

$$\vec{E}(\vec{r},t) = \vec{E}(\vec{r}) \exp(i\omega t)$$

where ω is the angular frequency of an electromagnetic wave propagating in a dielectric.

The Maxwell curl Equations 3 and 4 can be decoupled by dividing Equation 4 by the dielectric constant $\epsilon(\vec{r})$, applying the curl operator, and substituting Equation 3 for the curl of the electric field to give:

$$\Theta \vec{H}(\vec{r}) = \qquad \text{Equation 5}$$

$$\omega^2 \vec{H}(\vec{r}) \text{where } \Theta = \nabla \times \left( \frac{1}{\varepsilon(r)} \nabla \times \right) \text{ is a differential operator}.$$

Figure 1:
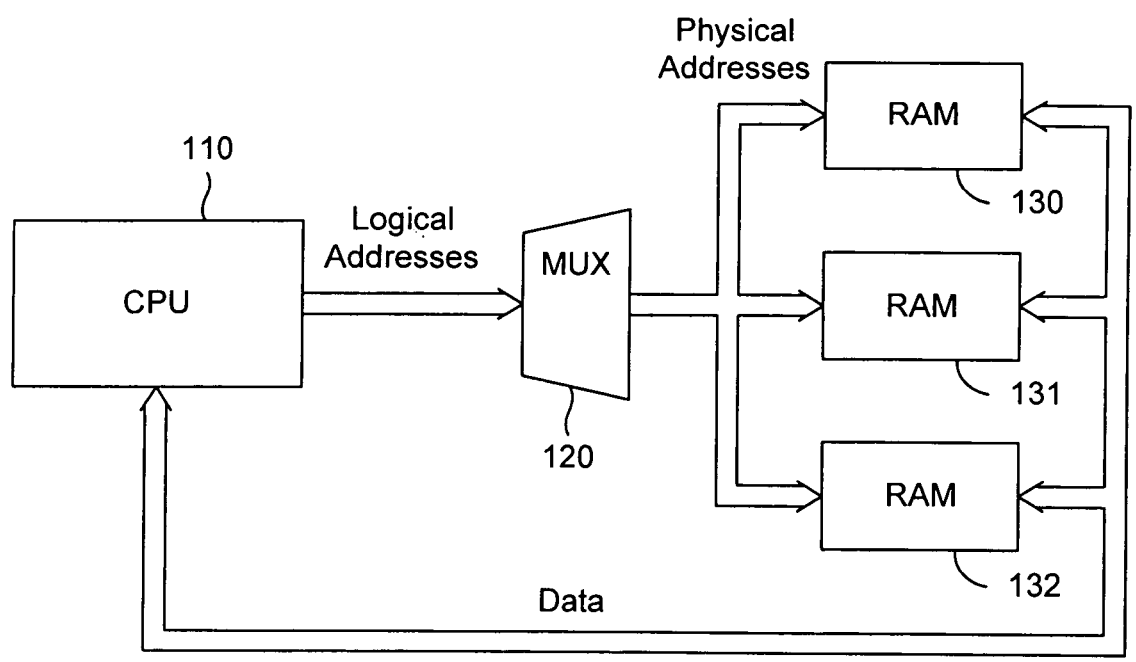
FIG. 1 illustrates an exemplary processor/memory interconnection architecture comprised of nanoelectronic tile components.

Equation 5 is an eigenvalue equation, where the eigenvalues are $\omega^2$ and the eigenfunctions are the magnetic field harmonic modes $\vec{H}(\vec{r})$. After the harmonic modes $\vec{H}(\vec{r})$ are determined according to Equation 5, the electric field harmonic modes $\vec{E}(\vec{r})$ can be obtained by substituting $\vec{H}(\vec{r},t)$ into Equation 3 and solving for $\vec{E}(\vec{r})$. For finite dimensional photonic crystals, such as the photonic crystals shown in FIGS. 1 and 2, the eigenvalues and eigenfunctions of Equations 5 are quantized to give:

$$\Theta \vec{H}_j(\vec{r}) = \omega_j^2 \vec{H}_j(\vec{r})$$

where j is a non-negative integer value called the "band index" that labels the harmonic modes in order of increasing angular frequency The translational symmetry of the photonic crystal can be used to determine the functional form of the harmonic modes $\vec{H}_j(\vec{r})$. For example, the functional form of the harmonic modes $\vec{H}_j(\vec{r})$ propagating in photonic crystal 100 are given by the following:

$$\vec{H}_{j,k_\parallel,k_z}(\vec{r}) = \exp(i\vec{k}_\parallel \cdot \vec{\rho}) \exp(ik_z z) \vec{\mu}_{j,k_\parallel,k_z}(z) \qquad \text{Equation 6:}$$

where $\vec{\rho}$ is an xy-plane vector,
$\vec{k}_\parallel$ is an xy-plane wave vector,
$k_z$ is a z-direction wave vector component, and
$\vec{\mu}_{n,k_\parallel,k_z}(z)$ is a periodic function in the z-direction.

The exponential term $\exp(i\vec{k}_\parallel \cdot \vec{\rho})$ in Equation 6 arises from the continuous translational symmetry of ER propagating through the dielectric layers in the xy-plane. However, the term $\exp(ik_z z) \vec{\mu}_{j,k_\parallel,k_z}(z)$ in Equation 6 arises from Bloch's theorem and the discrete translation symmetry imposed in the z-direction by the periodicity of the dielectric constant of photonic crystal 100, which is given by:

$$\epsilon(\vec{r}) = \epsilon(\vec{r} + \vec{R})$$

where $\vec{R} = a l \hat{z}$,
a is a lattice constant determined by the regular pattern of the dielectric layers, and
l is an integer.

The harmonic modes $\vec{H}_{j,k_\parallel,k_z}(\vec{r})$ are periodic for integral multiples of $2\pi/a$. As a result, the associated angular frequencies are also periodic:

$$\omega_j(k_z) = \omega_j\left(k_z + \frac{m 2\pi}{a}\right) \qquad \text{Equation 7}$$

Differences in the dielectric pattern of a photonic crystal creates one or more range of frequencies $\omega_j$, referred to as "photonic bandgaps," for which ER is prevented from propagating in the photonic crystal. The photonic bandgap also corresponds to an electromagnetic energy range, and a range of wavelengths, denoted by $\lambda_j$, for which the differences between the dielectrics prevents ER absorption and ER propagation. The wavelength $\lambda_j$ of ER transmitted through a photonic crystal is related to the angular frequency $\omega_j$:

$$\lambda_j = \frac{2\pi v}{\omega_j}$$

where v is the velocity of ER in the photonic crystal. Certain ER frequency ranges are not transmitted through a photonic crystal because high-frequency harmonic modes tend to concentrate electromagnetic energy in dielectric regions with a low dielectric constant, while low-frequency harmonic modes tend to concentrate electromagnetic energy in dielectric regions with a high dielectric constant. The electromagnetic energy can be determined from the variational principle as follows:

$$E(\vec{H}) = \frac{1}{2(\vec{H}, \vec{H})} \int d\vec{r} \frac{1}{\varepsilon(\vec{r})} |\nabla \times \vec{H}(\vec{r})|^2$$

$$\text{where } (\vec{H}, \vec{H}) = \int d\vec{r} \vec{H}(\vec{r}) * \vec{H}(\vec{r}), \text{ and}$$

"*" represents the complex conjugate.

Note that the electromagnetic energy is lower for harmonic modes propagating in regions with a high dielectric constant than for modes propagating in regions of a photonic crystal with a low dielectric constant.

The size and range of frequencies within a photonic bandgap of a one-dimensional photonic crystal depends on the relative difference between the dielectric constants of the dielectrics comprising a photonic crystal. One-dimensional photonic crystals with large relative differences between the dielectric constants of the materials comprising the photonic crystal have larger photonic bandgaps at higher frequency ranges than photonic crystals with smaller relative differences between the dielectric constants.

Figure 4A:
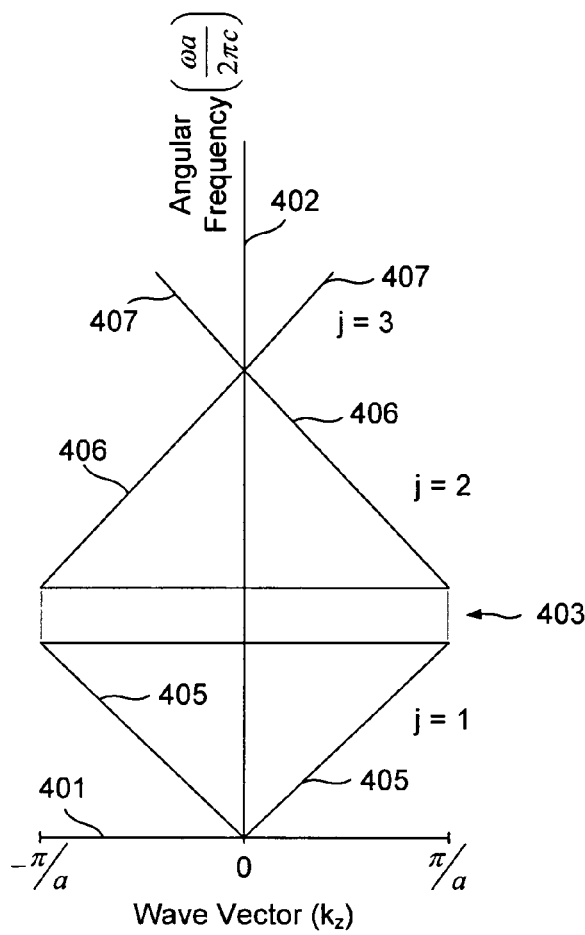
FIGS. 4A-4B are hypothetical plots of frequency versus the wave vector z-component $k_z$ for a first one-dimensional photonic crystal and a second one-dimensional photonic crystal, respectively.
Figure 4B:
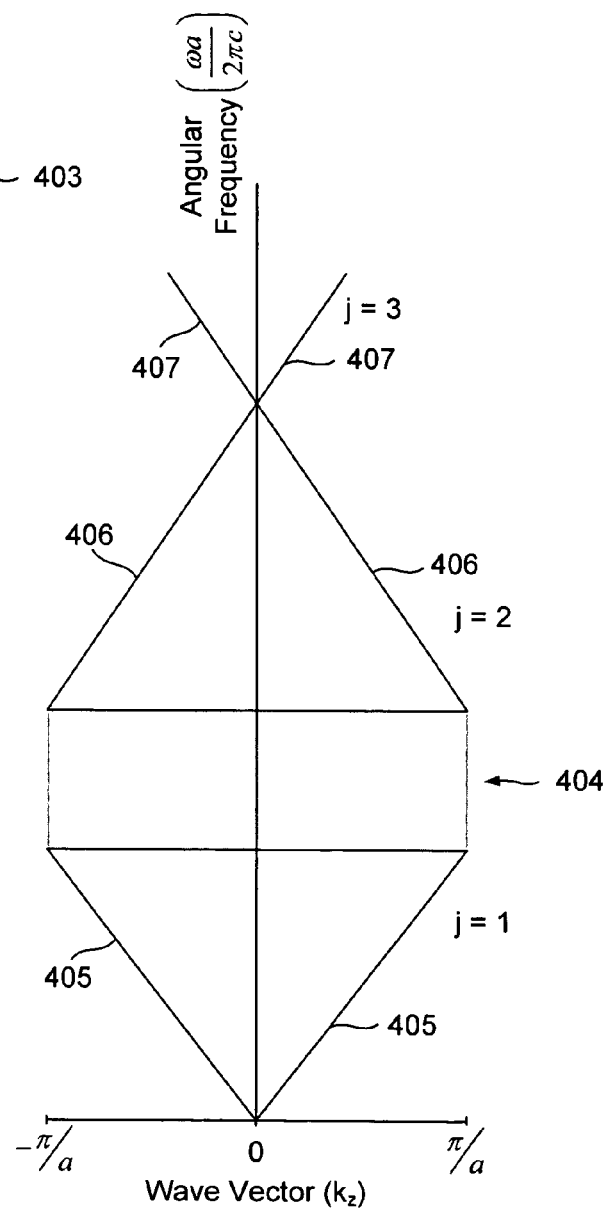

FIGS. 4A-4B are hypothetical plots of frequency ($\omega a/2\pi c$) versus the wave vector component $k_z$ for a first one-dimensional photonic crystal and a second one-dimensional photonic crystal, respectively. In FIGS. 4A-4B, horizontal axes, such as horizontal axis 401, correspond to wave vector z-component, $k_z$, while vertical axes, such as vertical axis 402, correspond to the frequency. Because the frequencies $\omega_j$ are periodic, as described above with reference to Equation 7, frequencies ($\omega_j a/2\pi c$) are plotted over wave vector z-component range $-\pi/a$ and $\pi/a$ for angular frequency bands j equal to 1, 2, and 3. The photonic bandgaps are identified by shaded regions 403 and 404. Lines 405, 406, and 407 correspond to the first, second, and third angular frequency bands (j=1, 2, and 3). The width of photonic bandgap 403, in FIG. 4A, is smaller than the width of photonic bandgap 404, in FIG. 4B, because the relative difference between the dielectric constants of the materials comprising the first photonic crystal is smaller than the relative difference between the dielectric constants of materials comprising the second photonic crystal. Also, photonic bandgap 403 covers a lower range of frequencies than the range of frequencies covered by photonic bandgap 404.

Figure 5:
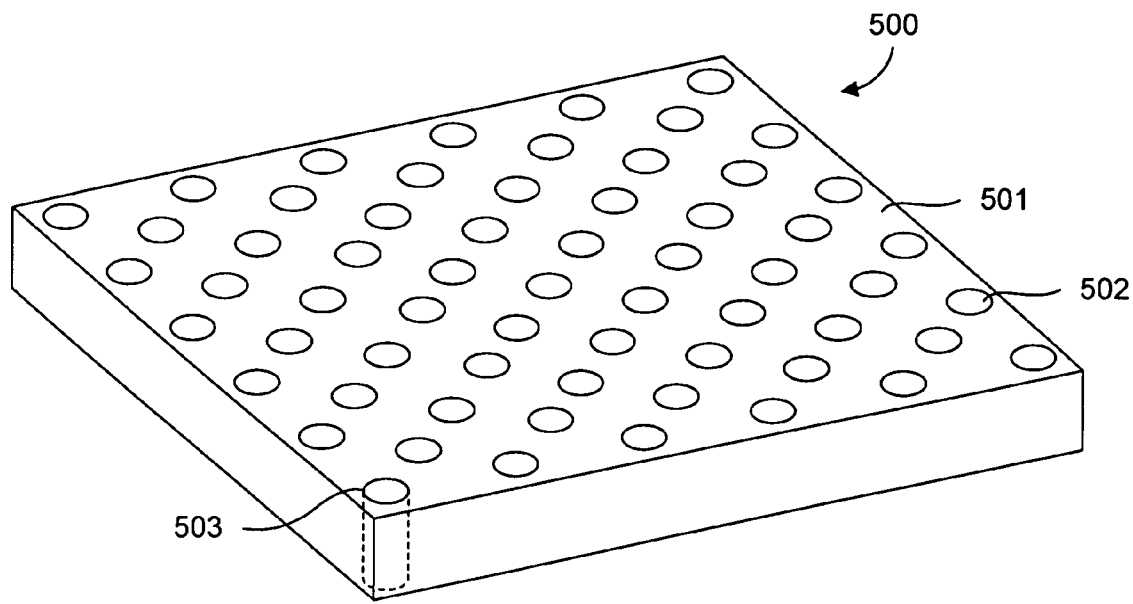
FIGS. 5-6 illustrate perspective views of two exemplary two-dimensional photonic crystals.
Figure 6:
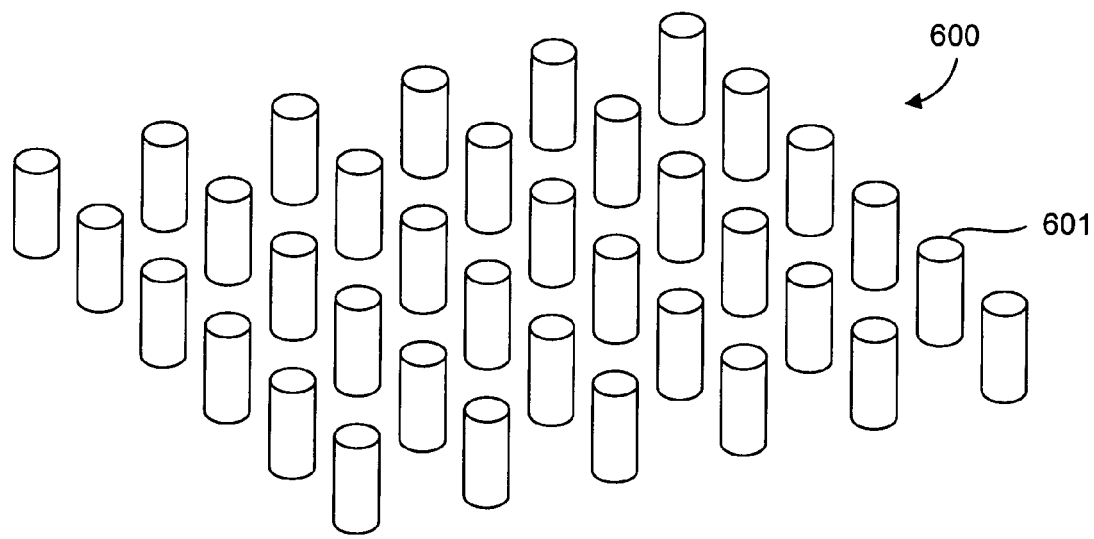

Two-dimensional photonic crystals can be composed of a regular lattice of cylindrical columns fabricated in a dielectric slab. The cylindrical columns can be air holes or holes filled with a dielectric material different from the dielectric material of the photonic slab. FIG. 5 illustrates a perspective view of an exemplary two-dimensional photonic crystal. In FIG. 5, photonic crystal 500 is composed of a dielectric slab 501 with a regular lattice of embedded cylindrical columns identified by ovals, such as oval 502. The cylindrical columns extend from the top surface to the bottom surface of slab 501, as indicated by cylindrical column 503, and can be holes filled with air or any other material having a dielectric constant different from the dielectric constant of the slab 501. Two-dimensional photonic crystals can also be composed of a regular lattice arrangement of cylindrical columns surrounded by a gas or a liquid. FIG. 6 illustrates a two-dimensional photonic crystal 600 having a regular square lattice of cylindrical columns, such as cylindrical column 601 of a material with a dielectric constant different from that of the surrounding medium.

Figure 7A:
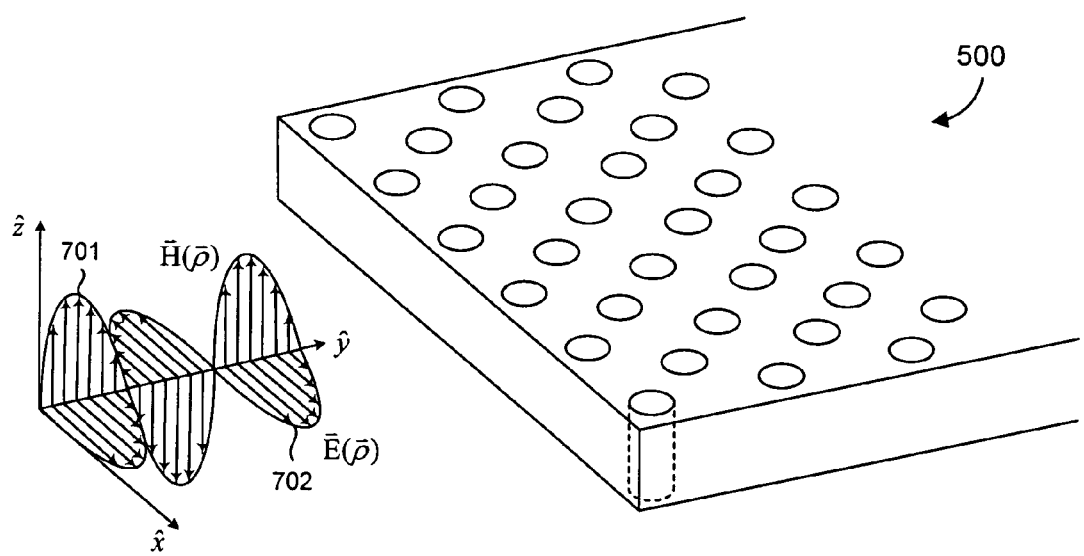
FIGS. 7A-7B illustrate propagation of a transverse electric field and magnetic field modes in the two-dimensional photonic crystal shown in FIG. 5.
Figure 7B:
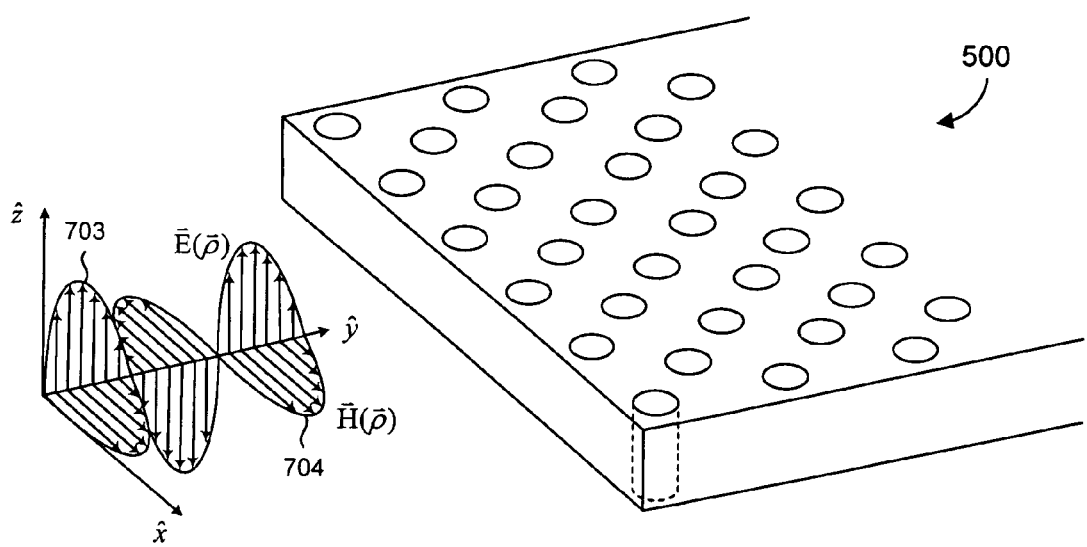

Two-dimensional photonic crystals polarize ER propagating in the periodic plane of the photonic crystal, and the harmonic modes can be classified into two distinct polarizations: (1) the transverse electric modes ("TE"); and (2) the transverse magnetic modes ("TM"). The TE have $\vec{H}(\vec{\rho})$ directed normal to the periodic plane of the photonic crystal and $\vec{E}(\vec{\rho})$ directed in the periodic plane of the photonic crystal, while the TM have $\vec{E}(\vec{\rho})$ directed normal to the periodic plane of the photonic crystal and $\vec{H}(\vec{\rho})$ directed in the periodic plane of the photonic crystal. FIGS. 7A-7B illustrate propagation of TE and TM in the two-dimensional photonic crystal shown in FIG. 5. The periodic plane of photonic crystal 500 lies in the xy-plane, the cylindrical columns are parallel to the z-direction, and ER propagates in photonic crystal 500 in the y-direction. In FIG. 7A, oscillating curve 701 represents the $\vec{H}(\vec{\rho})$ mode directed normal to the xy-plane, while oscillating curve 702 represents the orthogonal $\vec{E}(\vec{\rho})$ mode directed in the xy-plane. In FIG. 7B, oscillating curve 703 represents the $\vec{E}(\vec{\rho})$ mode directed normal to the xy-plane, while oscillating curve 704 represents the orthogonal $\vec{H}(\vec{\rho})$ mode directed in the xy-plane.

Figure 8:
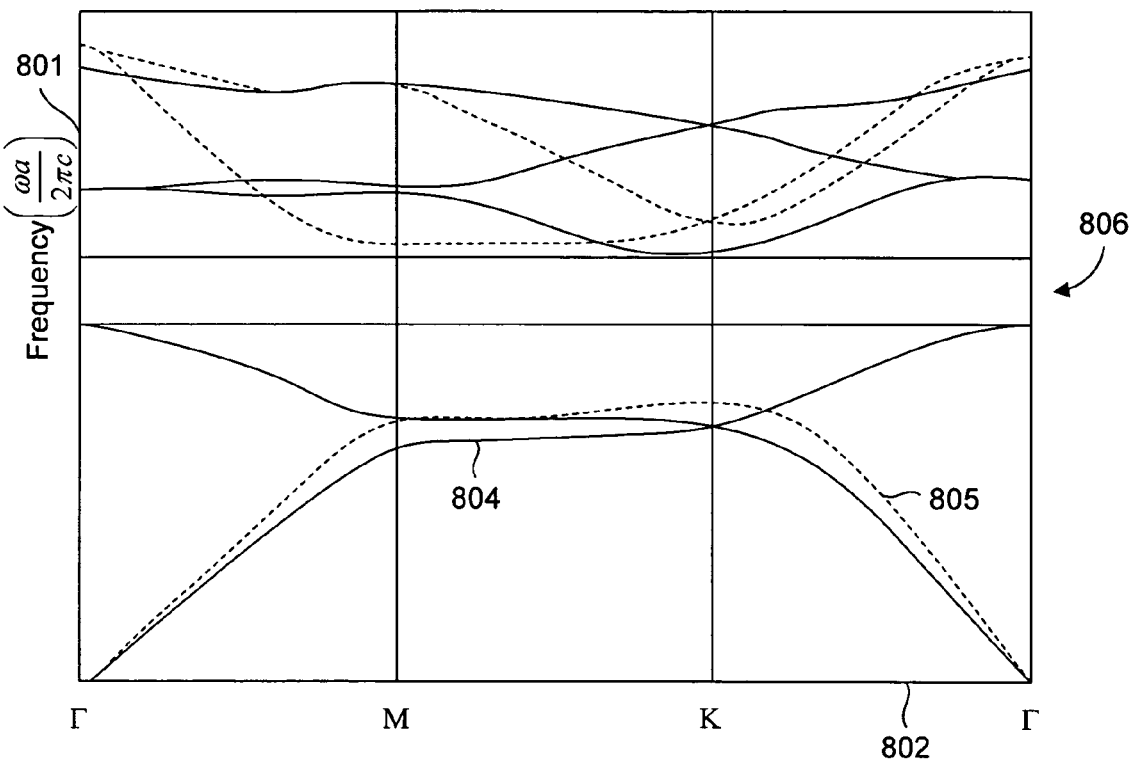
FIG. 8 illustrates a photonic band structure of transverse electric field and magnetic field modes propagating in the two-dimensional photonic crystal shown in FIG. 5.
Figure 8:
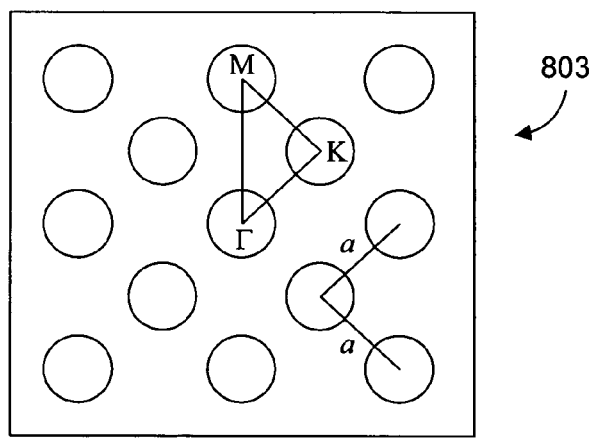

FIG. 8 illustrates a photonic band structure of TM and TE modes of ER propagating in the photonic crystal shown in FIG. 5. In FIG. 8, vertical axis 801 represents the angular frequency of ER propagating in photonic crystal 500, while horizontal axis 802 represents the ER propagation paths between points F, M, and K identified in photonic crystal segment 803 of photonic crystal 500, shown in FIG. 5. Solid lines, such as solid line 804, represent TM modes, and dashed lines, such as dashed line 805, represent the TE modes. Shaded region 806 identifies a photonic bandgap in which neither the TE nor TM modes are permitted to propagate in exemplary photonic crystal 500.

The width and the frequency range covered by photonic bandgaps in two-dimensional photonic crystal slabs, such as photonic bandgap 806, depends on the periodic spacing of the cylindrical columns, represented by lattice constant a, and the relative difference between the dielectric constant of the slab and the dielectric constant of the cylindrical columns. For example, the width of photonic bandgap 806 can be increased by selecting a dielectric constant for the slab that is relatively higher than the dielectric constant for the cylindrical columns. Also, the frequency range covered by photonic bandgap 806 can be shifted to a higher frequency range for larger relative differences between the dielectric constant of the slab and the dielectric constant of the cylindrical columns, while photonic bandgap 806 can be shifted to a lower frequency range for smaller relative differences between the dielectric constant of the slab and the dielectric constant of the cylindrical columns.

Electron beam, or nanoimprint lithography followed by chemical etching, or other processing methods can be used to fabricate cylindrical columns in a suitable two-dimensional dielectric slab. In addition, two-dimensional photonic crystals can be designed to reflect ER within a specified frequency band. As a result, a two-dimensional photonic crystal can be designed and fabricated as a frequency-band stop filter to prevent the propagation of ER having frequencies within the photonic bandgap of the photonic crystal. Generally, the size and relative spacing of cylindrical columns control which wavelengths of ER are prohibited from propagating in the two-dimensional photonic crystal. However, defects can be introduced into the lattice of cylindrical columns to produce particular optical components. In particular, a point defect, referred to as a "resonant cavity," can be fabricated to provide a resonator that temporarily traps a narrow frequency range of frequencies of wavelengths of ER. A line defect, referred to as a "waveguide," can be fabricated to transmit frequency ranges or wavelengths of ER that lie in a frequency range of a photonic bandgap.

Figure 9:
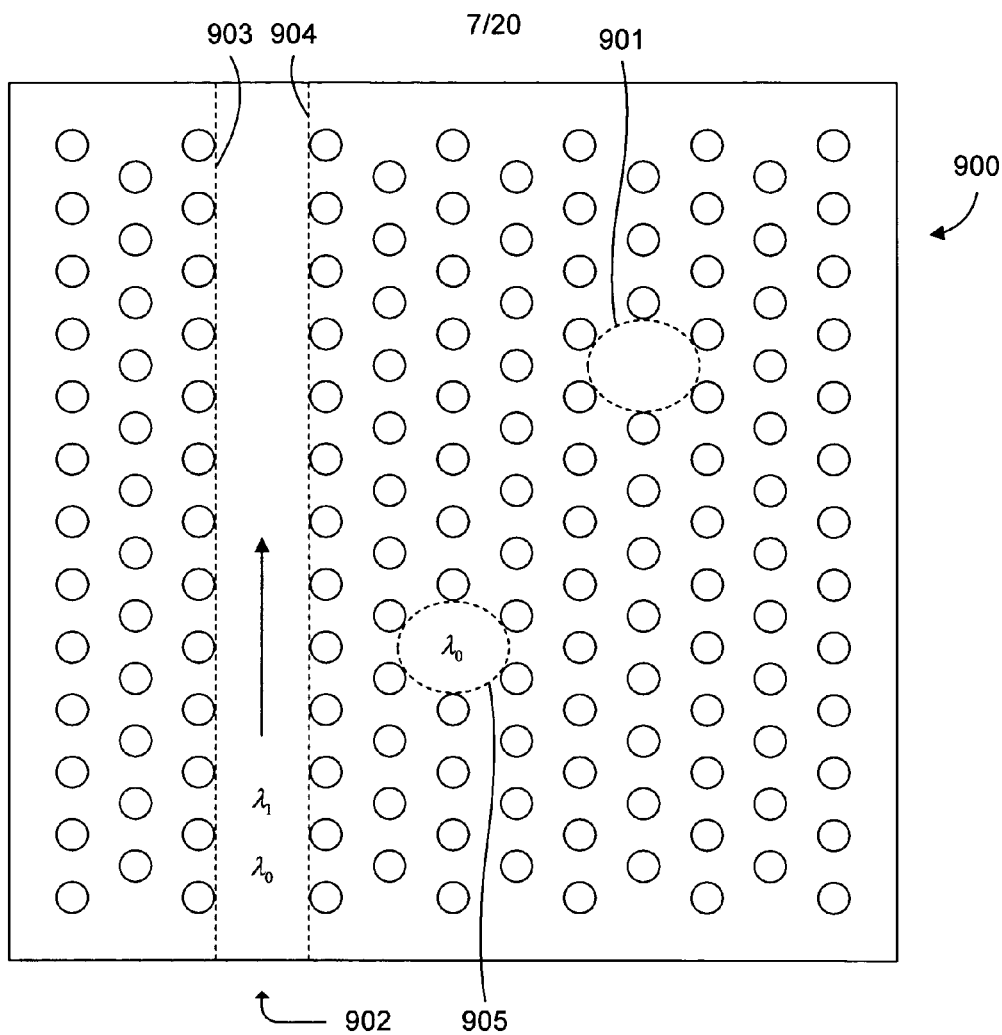
FIG. 9 illustrates an exemplary photonic crystal with two resonant cavities and a waveguide.

FIG. 9 illustrates an exemplary photonic crystal with two resonant cavities and a waveguide. A resonant cavity can be created in a two-dimensional photonic crystal slab by removing, increasing, or decreasing the size of a select cylindrical column. For example, resonant cavity 901 is created in photonic crystal 900 by removing a cylindrical column, as indicated by the empty region surrounded by a dashed-line circle. Resonant cavities 901 and 905 are surrounded by effectively reflecting walls that temporarily trap ER in the frequency range of the photonic bandgap. Resonant cavities can channel ER within a narrow frequency band in a direction perpendicular to the plane of the photonic crystal. For example, resonant cavity 901 can trap localized TMs and TEs within a narrow frequency band of the photonic bandgap. Unless photonic crystal 900 is sandwiched between two reflective plates or dielectrics that create total internal reflection, the ER resonating in resonant cavity 901 can escape in the direction perpendicular to the periodic plane of photonic crystal 900. Note that each resonant cavity has an associated quality ("Q") factor that provides a measure of how many oscillations take place in a cavity before the ER resonating in the resonant cavity diffuse into the region surrounding the resonant cavity.

Waveguides are optical transmission paths that can be used to direct ER within a particular frequency range of the photonic bandgap, from a first location in a photonic crystal to a second location in the photonic crystal. Waveguides can be fabricated by changing the diameter of certain cylindrical columns within a column or row of cylindrical columns, or by removing rows of cylindrical columns. For example, in photonic crystal 900, dielectric waveguide 902 is created by removing an entire row of cylindrical columns, as indicated by the empty region between dashed lines 903 and 904, to transmit ER with wavelengths $\lambda_0$ and $\lambda_1$ along a single path. Networks of branching waveguides can be used to direct ER in numerous different pathways through the photonic crystal. The diameter of an optical field propagating along a waveguide can be as small as $\lambda/3n$, where n is the refractive index of the waveguide, while a harmonic mode volume of a resonant cavity can be as small as $2(\lambda/3n)^3$.

Waveguides and resonant cavities may be less than 100% effective in preventing ER from escaping into the area immediately surrounding the waveguides and resonant cavities. For example, ER within a frequency range in the photonic bandgap propagating along a waveguide also tends to diffuse into the region surrounding the waveguide. ER entering the area surrounding a waveguide or a resonant cavity experiences an exponential decay in amplitude, a process referred to as "evanescence." As a result, a resonant cavity can be located within a short distance of a waveguide to allow certain wavelengths of ER carried by the waveguide to be extracted by the resonant cavity. In effect, resonant cavities are filters that can be used to extract a fraction of a certain wavelength of ER propagating in the waveguide. Depending on a resonant cavity Q factor, an extracted ER can remain trapped in a resonant cavity and resonate for a time before evanescing into the surroundings or backscattering into the waveguide. For example, in FIG. 9, resonant cavity 901 is located too far from waveguide 902 to extract a wavelength of ER. However, resonant cavity 905 is able to extract a fraction of ER with wavelength $\lambda_0$ propagating along waveguide 902. Thus, a smaller fraction of ER with wavelength $\lambda_0$ is left to propagate in waveguide 902 along with ER of wavelength $\lambda_1$.

Figure 10:
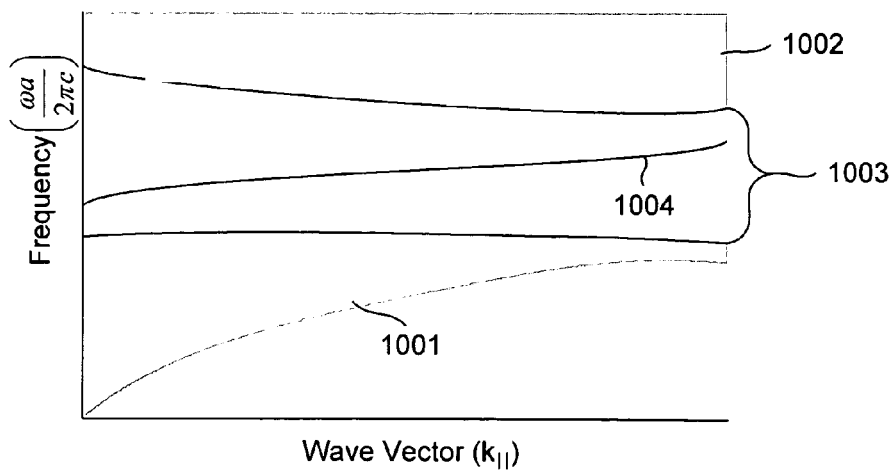
FIG. 10 is a hypothetical plot of frequency versus wave vector for the waveguide of the photonic crystal shown in FIG. 9.

FIG. 10 is a hypothetical plot of frequency versus that magnitude of wave vector $\vec{k}_\parallel$ for the waveguide of the photonic crystal shown in FIG. 9. In FIG. 10, shaded regions 1001 and 1002 represent the projected first and second band structure of photonic crystal 900 in the absence of waveguide 902, shown in FIG. 9. Region 1003 identifies the photonic bandgap created by photonic crystal 900. Line 1004 identifies a band of frequencies permitted to propagate in waveguide 902. The number of frequency bands permitted to propagate in waveguide 902 can be increased by increasing the size of waveguide 902. For example, either or both columns of cylindrical columns on either side of waveguide 902 can be removed to increase the size of waveguide 902.

For three-dimensional photonic crystals, the three-dimensional lattice parameters, the difference between dielectric constants, and the dimensions of the inclusions determine the frequency range of photonic bandgaps. Waveguides and resonant cavities can also be fabricated in three-dimensional photonic crystals by selectively removing or changing the dimensions of certain inclusions.

While a brief introduction to photonic crystals is provided above, a more detailed description is also available in "Photonic Crystals: Molding the Flow of Light," by J. D. Joannopoulos, et al., Princeton University Press, 1995, and "Optical Properties of Photonic Crystals," by K. Sakoda, Springer, 2001.

Note that other kinds of waveguides can be used to transmit specific frequency channels of an optical signal, such as ridged waveguides or tapered optical fibers that can be coupled to a microsphere or a microdisk resonator. These waveguide structures are larger than photonic bandgap crystals, and tend to have lower loss due to evanescence. See e.g., A. W. Snyder and J. Love, "Optical Waveguide Theory," Chapman and Hall 1983; K. Vahala, "Optical Microcavities," World Scientific 2005.

An Overview of Clock Signals

Figure 11:
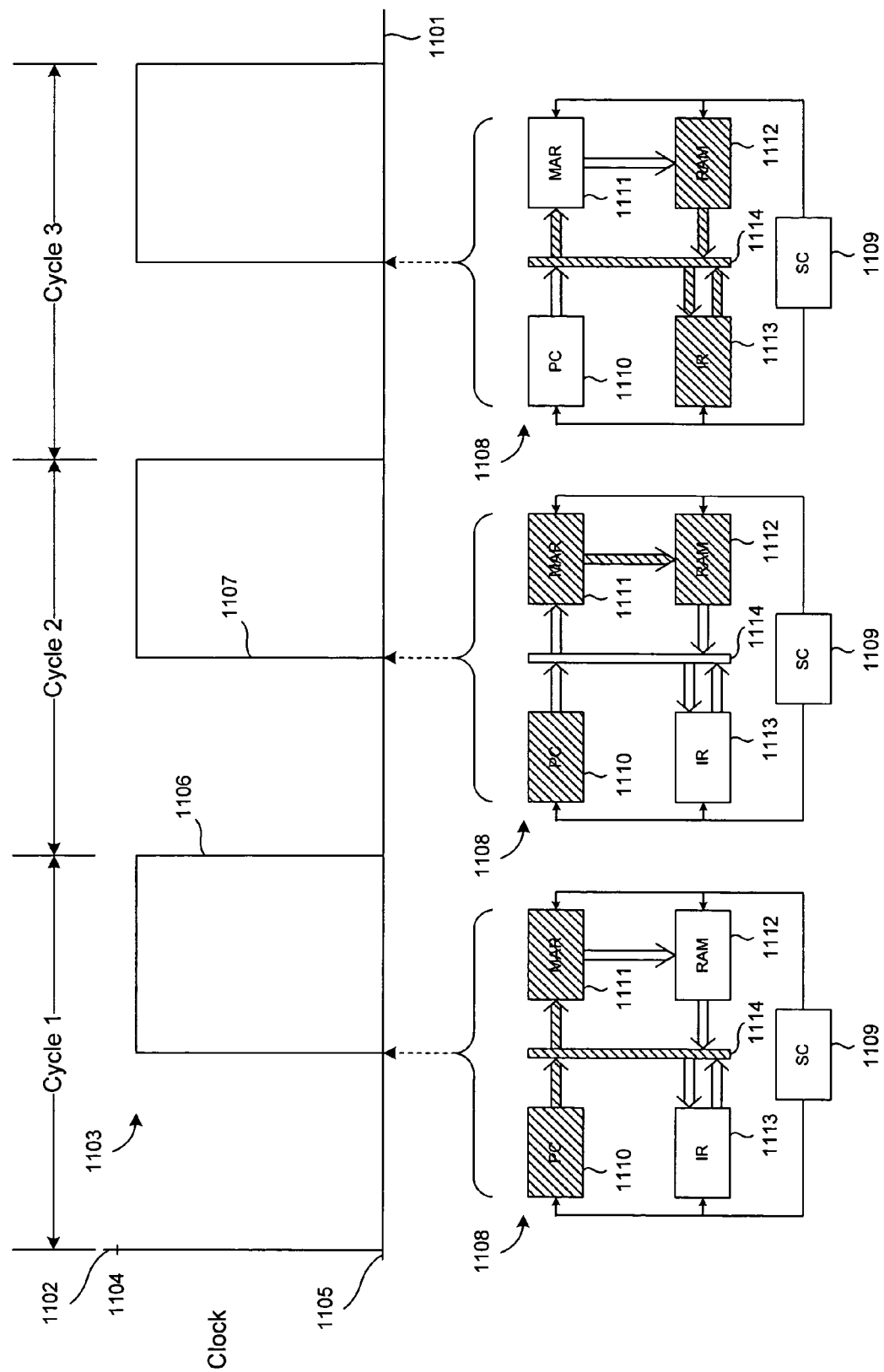
FIG. 11 illustrates an exemplary operation of a clock signal to retrieve a program instruction stored in random access memory.

Microcomputers typically employ a clock signal to synchronize the actions of two or more IC components. A clock signal is typically an electrical signal that oscillates between a high state and a low state at a specific rate. FIG. 11 illustrates an exemplary operation of a clock signal to retrieve a program instruction stored in RAM. In FIG. 11, horizontal axis 1101 represents time and vertical axis 1102 represents current. A square wave 1103 represents three cycles of a clock signal that oscillates between high signal 1104 and low signal 1105. For example, Cycle 2 begins with falling edge 1106, includes a time interval when the signal is low, a rising edge 1107, and a time interval when the signal is high that ends with the next falling edge. Circuits receiving a clock signal may become active at either or both of the rising or falling edges of each clock cycle. A CPU may execute a single instruction during a single clock cycle, or may execute as many as 20 or more instructions in a single clock cycle, depending on the architecture and current operating conditions of the CPU. The faster the clock rate, the more instructions a CPU can execute within a given period of time. Clock rates are often generated by a crystal, such as a quartz crystal located in a system clock, that oscillates at a predictable rate in the megahertz ("MHz") or gigahertz ("GHz") frequency ranges.

A basic computer architecture 1108 is shown in FIG. 11 to illustrate retrieval of a program instruction stored in RAM. The architecture diagram 1108 shows a system clock 1109, program counter 1110, memory address register ("MAR") 1111, RAM 1112, instruction register 1113, and bus 1114. Clock signal 1103 is generated by system clock 1109 and passed to each component to synchronize the operation of each component. Hash-marked components represent the components activated by a rising clock-cycle edge of clock signal 1103. For example, hash-marked program counter 1110, hash-marked MAR 1111, and hash-marked wire bus 1114 are activated on the rising edge of Cycle 1. Program instructions are stored sequentially in the memory locations of RAM 1112. At the beginning of each program execution, program counter 1110 is set to the address of the first instruction of a program. During Cycle 1, program counter 1110 transmits the address of memory location storing a next program instruction in MAR 1111 via bus 1114. During Cycle 2, program counter 1101 is incremented to prepare for the next program instruction to be retrieved from RAM 1112, and RAM 1112 receives the address from MAR 1102. During Cycle 3, RAM 112 retrieves and places the first program instruction on wire bus 1114 for retrieval by instruction register 1113. The first program instruction can then be executed by other components (not shown) that are also synchronized by the clock signal.

Embodiments of the Present Invention

In one embodiment of the present invention, a large number of relatively high capacitance electrical signal line interconnections needed to transmit address signals, clock signals, and data signals within a computer system are replaced with a relatively small number of high-speed photonic interconnections. In certain embodiments of the present invention, the photonic interconnections are composed of one or more waveguides that confine and direct the transmission of electromagnetic radiation ("ER"). The waveguides can be coaxial cables, optical fibers, line defects in photonic crystals, or any other medium that can be used to simultaneously transmit a number of different frequency channels.

Figure 12A:
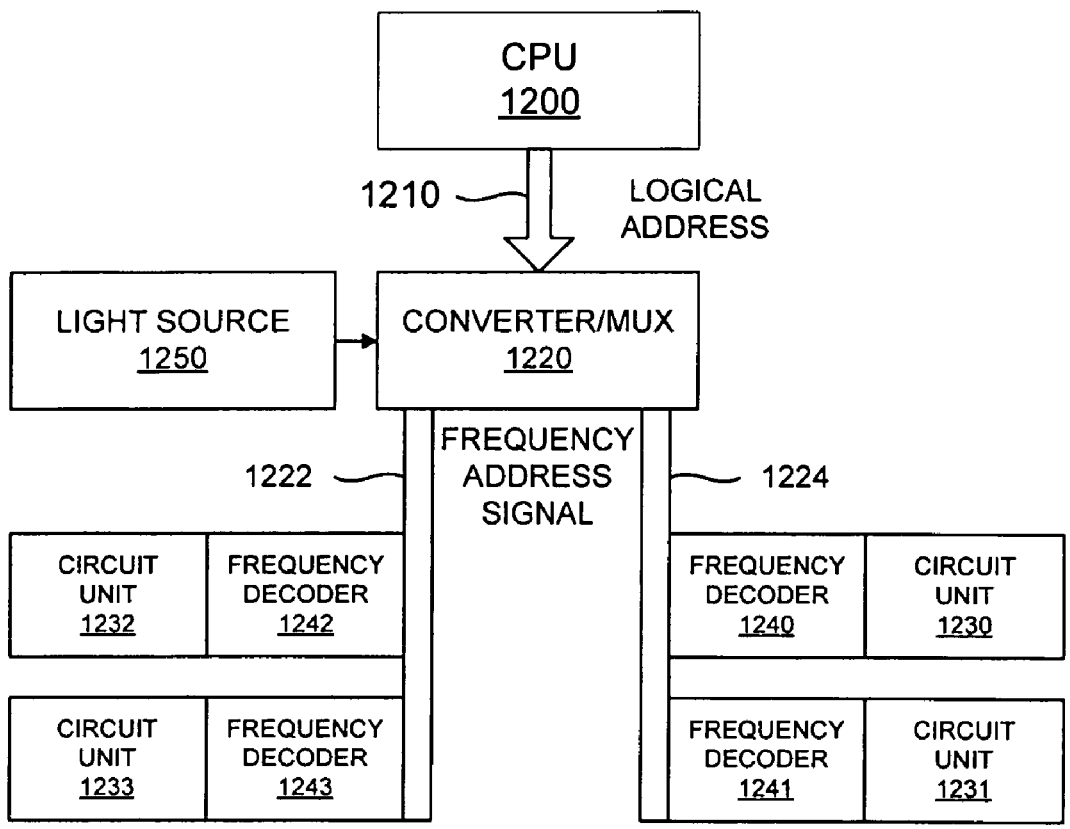
FIGS. 12A-12C illustrate photonic interconnection architectures for integrated circuits, each representing an embodiment of the present invention.
Figure 12B:
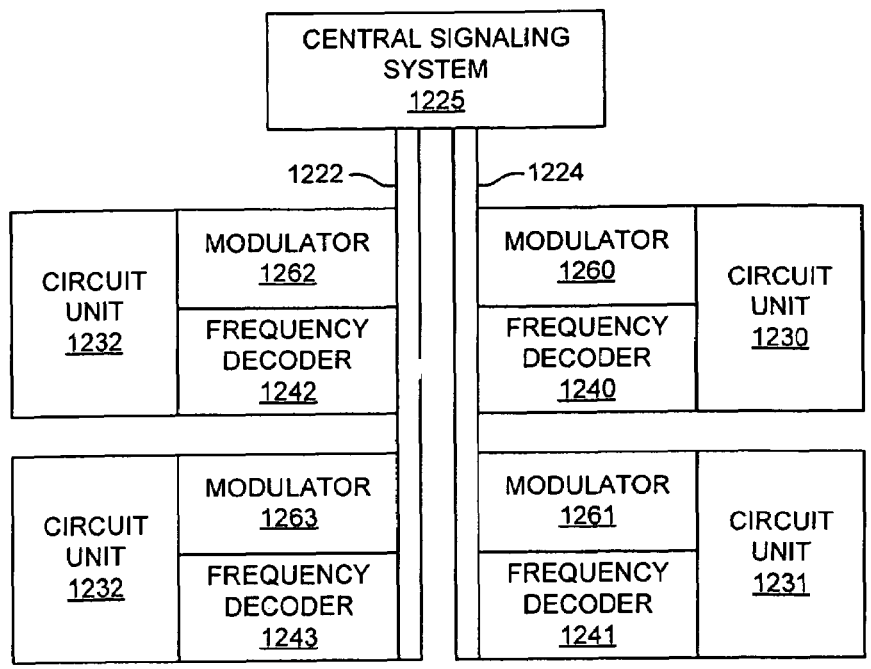
Figure 12C:
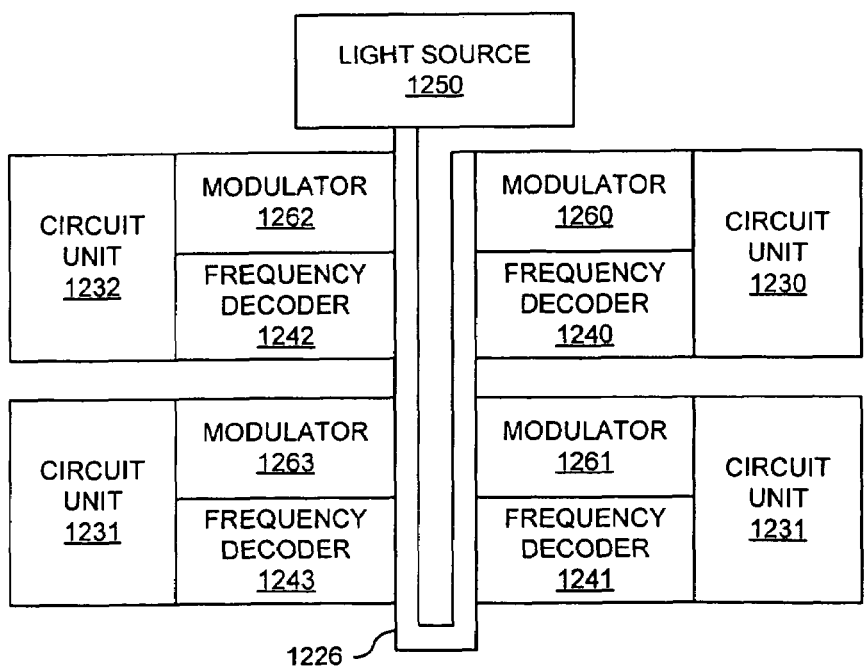

FIGS. 12A-12C illustrate photonic interconnection architectures for ICs, each representing an embodiment of the present invention. FIG. 12A illustrates a first exemplary IC photonic interconnection architecture. CPU 1200 accesses circuit units 1230-1233 via converter 1220. Circuit units 1230-1233 can be memory, logical circuits, sensors, or any other addressable unit. In order for CPU 1200 to access particular locations within each circuit unit, CPU 1200 generates and transmits address signals that corresponding to the particular locations within each circuit-unit, to converter 1220 via signal bus 1210. CPU 1200 can be an electrical circuit of conventional or nanoscale design that generates multi-bit logical address signals. Converter 1220 receives the logical address signals as well as an optical signal from light source 1250. Light source 1250 can be located externally to the IC. The optical signal transmitted by light source 1250 may be composed of D different frequency channels. Converter 1220 modulates one of the D frequency channels to produce an optical clock signal that synchronizes the operation of each circuit unit. Converter 1220 modulates each of the remaining D-1 frequency channels to serve as data and address transmission channels. A modulator toggles the intensity of the frequency channel between high and low signal levels representing binary values "1" and "0" to create a serial data stream. Converter 1220 transmits an optical signal containing the modulated frequency channels on waveguides 1222 and 1224. Any desired protocol for the serial data stream can be employed, such as Return to Zero ("RZ") encoding, Non-Zero Return to Zero ("NRZ") encoding, Manchester encoding, or differential Manchester encoding of the serial data stream.

Frequency decoders 1240-1243 selectively extract only the frequency channels directed to the circuit unit 1230-1233, respectively. Frequency decoders 1240-1243 each receive the frequency channel corresponding to the clock signal so that corresponding circuit unit operations can be synchronized. Converter 1220 can send optical signals in parallel to all circuit units without regard for the physical location of the circuit units, because the frequency decoder associated with a circuit unit receives the signals transmitted via the modulated frequency channels directed to the circuit unit. For example, converter 1220 can transmit an optical signal that simultaneously includes a first frequency channel directed to circuit unit 1230 and a second frequency channel directed to circuit unit 1231 on waveguide 1224. Because the frequency channels recognized by frequency decoder 1240 are different from the frequency channels recognized by frequency decoder 1241, frequency decoder 1240 receives and decodes the first frequency channel and passes the data to circuit unit 1230 while ignoring the second frequency channel. Frequency decoder 1241 ignores the first frequency channel, receives and decodes the second frequency channel and passes the data to circuit unit 1231. A circuit unit can read data extracted from a frequency channel or write data by modulating a frequency channel to return data to converter 1220.

In alternate embodiments of the present invention, circuit units 1230-1233 can each contain multiple nanoelectronic tiles (e.g., memory tiles) that each include a corresponding local frequency decoder, and circuit units 1230-1233 can be mosaics of microscale or nanoscale arrays of logic circuits, memory, or sensors. In an alternate embodiment of the present invention, both a frequency channel and a physical waveguide together compose a distinct data channel. Frequency decoders connected to two distinct waveguides can be separately accessed despite that fact that both recognize a common frequency channel.

FIG. 12B illustrates a second exemplary IC photonic interconnection architecture. Circuit units 1230-1233, which can be of the same or different types, communicate with each other via waveguides 1222 and 1224 and a central signaling system 1225. Circuit units 1230-1233 are each connected to a corresponding frequency decoder 1240-1243, respectively, that decodes frequency channels directed to circuit units 1230-1233, and a corresponding modulator 1260-1263, that can be used to modulate frequency channels for transmission to other circuit units. Central signaling system 1225 distributes a clock-signal frequency channel on waveguides 1222 and 1224 to synchronize each circuit unit. Central signal system 1225 also receives and retransmits data encoded in frequency channels encoded by modulators 1260-1263.

FIG. 12C illustrates a third exemplary photonic interconnection architecture. In FIG. 12C, circuit units 1230-1233 communicate directly with each other via a single waveguide 1226. External light source 1250 drives optical signals on waveguide 1226. One of the frequency channels of the optical signals corresponds to a clock signal that is received by frequency decoders 1240-1243. Circuit units 1230-1233 use corresponding modulators 1260-1263 to encode data in frequency channels that can be transmitted on waveguide 1226 and decoded by frequency decoders 1240-1243.

In general, waveguides 1222, 1224, and 1226 provide a two-way optical connection between individual circuit units either directly, as shown in FIG. 12C, or through a central signaling system 1225, as shown in FIG. 12B. The waveguides operate at the group velocity of light transmitted in the waveguides to provide high-speed performance. In the above described embodiments, the number of interconnections needed for intercircuit communication can be reduced by employing a single waveguide to transmit circuit unit addresses and data. Since each frequency channel is associated with a specific circuit unit that can be located anywhere on the communication waveguides, circuit units can operate without knowledge of the physical location of the other circuit units. As long as every circuit unit has access to the full data stream carried by the waveguides, each circuit unit can extract and process data transmitted to the circuit.

Figure 13A:
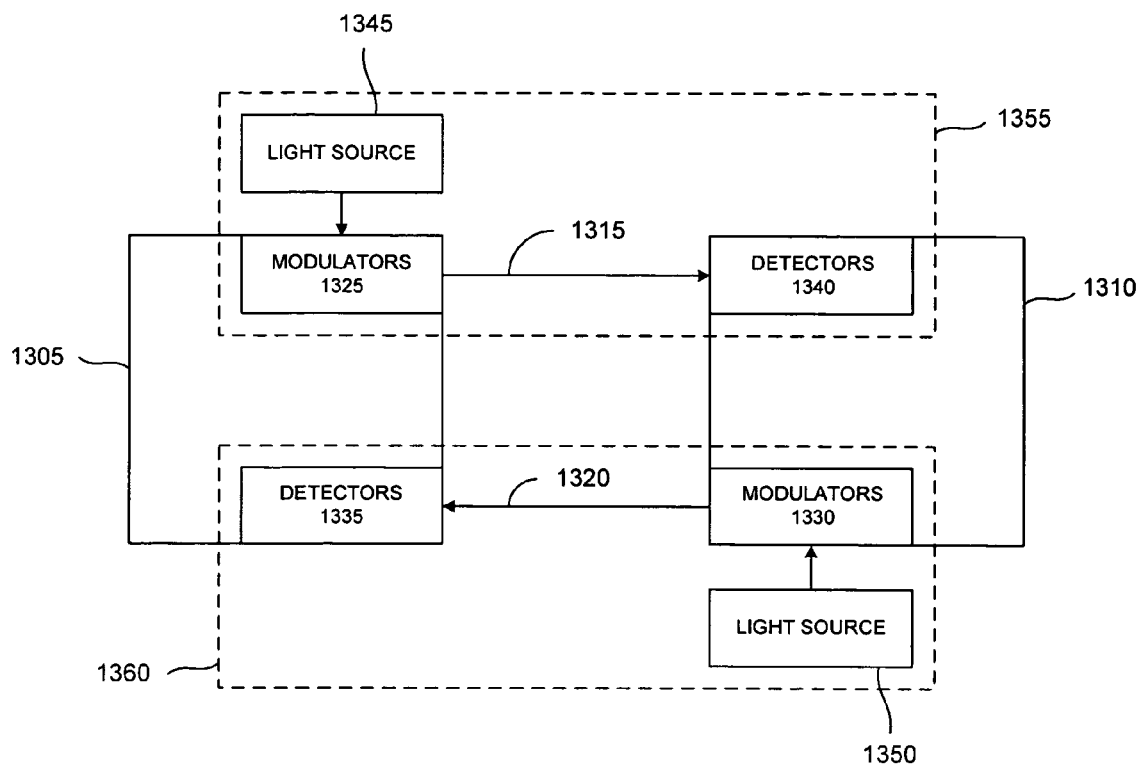
FIGS. 13A-13B illustrate photonic interconnection architectures for transmitting optical signals between integrated circuits, each representing one of many possible embodiments of the present invention.
Figure 13B:
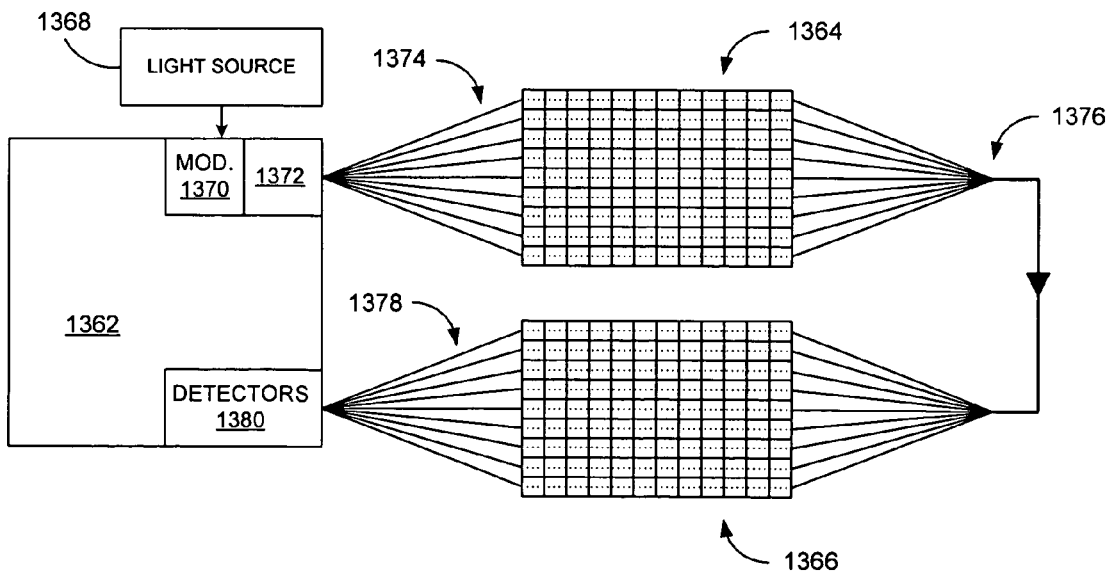

Photonic interconnection architectures can be used to interconnect ICs. FIGS. 13A-13B illustrate photonic interconnection architectures for transmitting optical signals between ICs, each representing one of many possible embodiments of the present invention. FIG. 13A illustrates a photonic interconnection architecture for communication between ICs 1305 and 1310 using optical transmission paths 1315 and 1320. Optical transmission paths 1315 and 1320 can be coaxial cables, optical fibers, or line defects in photonic crystals. ICs 1305 and 1310 can each implement different functions, each IC having an optical output interface, provided by modulators 1325 and 1330, and each IC having an input interface, provided by photodetectors 1335 and 1340, that are suitable for transmitting and receiving data sent between ICs 1305 and 1310. Modulator 1325 and detector 1335 can be mounted on IC 1305, and modulator 1330 and detector 1340 can be mounted on IC 1310. Light sources 1345 and 1350 can be located externally to ICs 1305 and 1310, respectively. Suitable light sources include GaAs laser diodes that generate optical signals modulated by modulators 1325 and 1330.

Optical signals are transmitted between ICs 1305 and 1310 by aligning light source 1345, modulator 1325, and detector 1340 in a first optical assembly 1355, and aligning light source 1350, modulator 1330, and detector 1335 in a second optical assembly 1360. Mechanical index guides may be included on optical assemblies 1355 and 1360 to allow this alignment to be automated for fabrication. After optical assemblies 1355 and 1360 have been fabricated and aligned for transmitting and receiving optical signals, optical assemblies 1350 and 1355 can be mounted on, and electrically connected to, ICs 1305 and 1310.

Additional types of light sources 1345 and 1350 may include mode-locked lasers that provide optical signals composed of one or more frequency channels that are decoded by detectors 1335 and 1340, respectively. One of the frequency channels corresponds to a clock signal that can be used to synchronize the operation of ICs 1305 and 1310. Modulators 1325 and 1330 store data by modulating the frequency channels of the optical signal generated by corresponding light sources 1345 and 1350, respectively. Optical transmission paths 1315 and 1320 direct the frequency channels modulated by modulators 1325 and 1330 to detectors 1340 and 1335, respectively. The receiving ICs decode the data using separate photodetectors for each frequency channel.

FIG. 13B illustrates a photonic interconnection architecture for transmitting data between an IC and a series of mosaics. IC 1362 can implement processing or other functions that require access to mosaics of nanoelectronic tiles 1364 and 1366. The nanoelectronic tiles can be nanoelectronic memory tiles or nanoelectronic logic circuit tiles. Light source 1368 provides an optical signal containing D frequency channels, each of the D-1 frequency channels corresponds to a different nanoelectronic tile in mosaics 1364 and 1366, and the remaining frequency channel corresponds to a clock signal. Modulator 1370 receives the optical signal from light source 1368 and modulates the frequency channels to correspond to particular nanoelectronic tiles in mosaics 1364 and 1366.

Optical element 1372, such as 3 dB couplers, splits the output optical signal emerging from IC 1362 into waveguides 1374. Waveguides 1374 can transmit an optical signal comprising a larger number of modulated frequency channels that encode data and a frequency channel that encodes a clock signal in parallel to all of the nanoelectronic tiles in mosaic 1364. Waveguides 1376 connect the nanoelectronic tiles in mosaic 1364 in series and relay the optical signal sequentially to the nanoelectronic tiles of mosaic 1366. Each nanoelectronic tile in mosaics 1362 and 1366 samples the frequency channels and extracts the clock signal. Nanoelectronic tiles extract specific frequency channels and then perform the requested action encoded in the frequency channel, such as writing data to the nanoelectronic tile.

The accessed nanoelectronic tiles in mosaics 1364 and 1366 can modulate one or more frequency channels that are selected for transmission to the IC 1362. The modulated frequency channels pass through the remainder of nanoelectronic tiles of mosaic 1366 onto waveguides 1378 leading to one or more detectors 1380 in IC 1362. Detectors 1380 extract any data passed from the nanoelectronic tiles of mosaics 1364 and 1366 to IC 1362.

The high degree of parallelism available through architectures, such as the architecture illustrated in FIG. 13B, can be applied to large arrays of RAM (exceeding 1 GB) in ICs 1364 and 1366 that can be accessed at data rates of 100 Gb/s or more, and can be applied to arrays of logic circuits in ICs 1364 and 1366 capable of operating at similar rates.

Figure 14A:
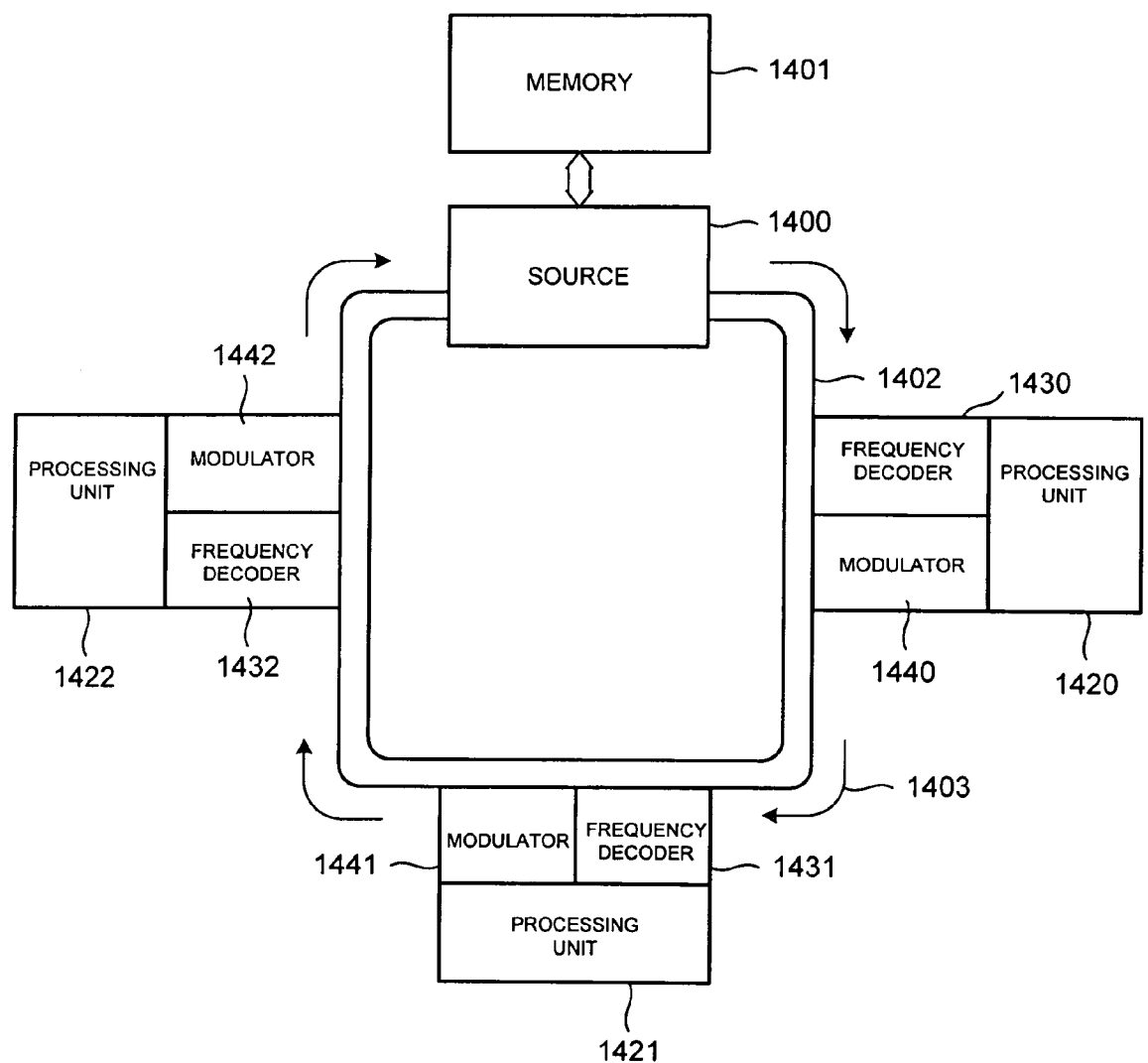
FIGS. 14A-14B illustrate photonic interconnections for two parallel computing architectures, each representing one of many possible embodiments of the present invention.
Figure 14B:
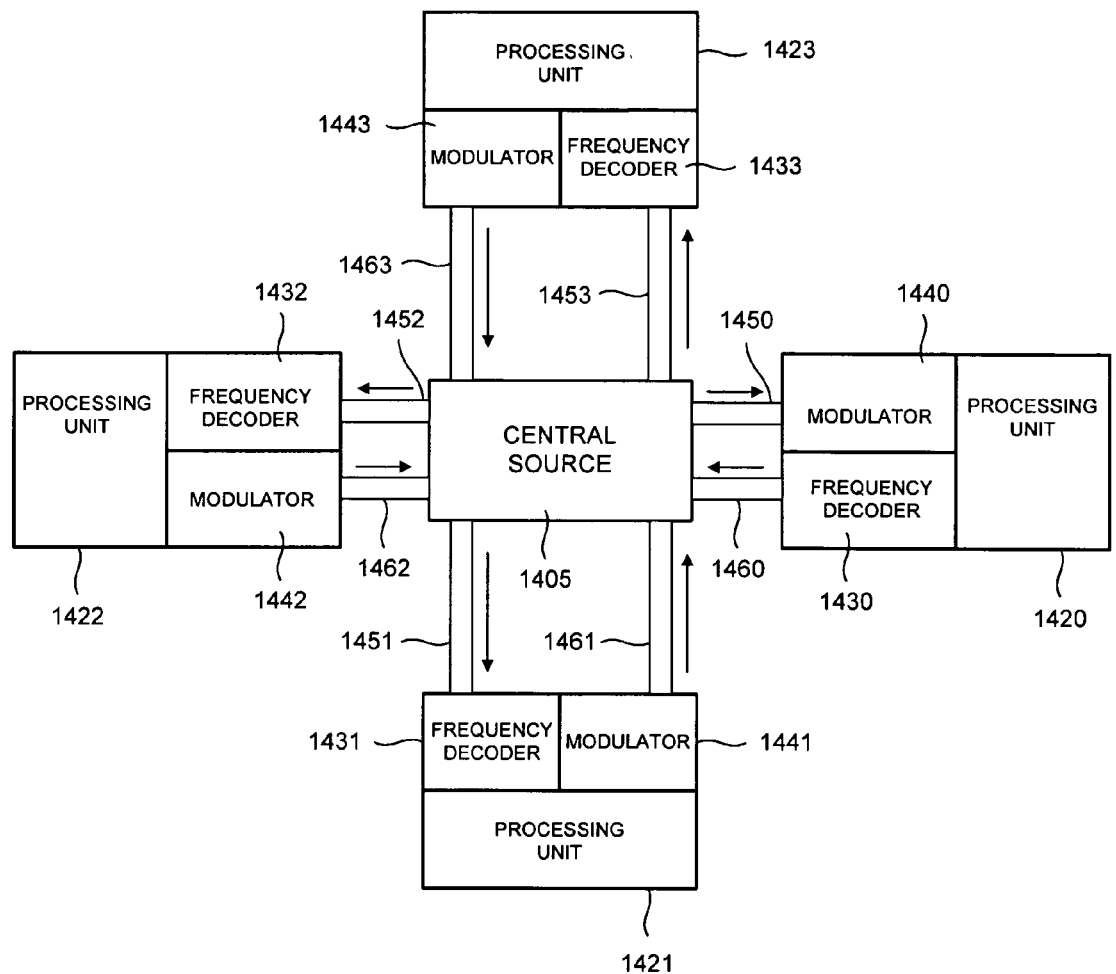

Photonic interconnections can be used to transmit data and clock signals within a parallel computing architecture. FIGS. 14A-14B illustrate photonic interconnections for two parallel computing architectures, each representing one of many possible embodiments of the present invention. In FIG. 14A, source 1400 provides an optical signal composed of D independent frequency channels. One of the D frequency channels encodes a clock signal to synchronize operation of processing units 1420-1422 and each of the remaining D-1 frequency channels encodes a particular data stream. Source 1400 is connected to external memory 1401. The optical signal generated by source 1400 is transmitted on a single waveguide 1402 in the direction identified by directional arrows, such as directional arrow 1403. Waveguide 1402 can be a coaxial cable, an optical fiber, a line defect in a photonic crystal, or any other medium suitable for simultaneously transmitting numerous, independent frequency channels. Frequency decoders 1430-1432 extract and decode the frequency channels directed to the corresponding processing units 1420-1422. For example, frequency decoder 1430 extracts and decodes only those frequency channels carried by waveguide 1402 that are directed to processing unit 1420 and extracts a fraction of the frequency channel corresponding to the clock signal to synchronize operation of the components of processing unit 1420. Each processing unit 1420-1422 may be composed of a CPU and local memory. Modulators 1440-1442 allow corresponding processing units to encode data directed to different processing units or an address that can be used to store data in, or retrieve data from, memory 1403.

In FIG. 14B, central source 1405 uses a number of different waveguides to transmit data and clock signals encoded in frequency channels of optical signals to processing units 1420-1423. Central source 1405 may include a light source, a CPU and memory that can be accessed by each processing unit. Central source 1405 can be used to distribute the frequency channels corresponding to the clock signal and data via waveguides 1450-1453, receive data generated by processing unit 1420-1423 via waveguides 1460-1463, and store data in memory for use by each processing unit. Waveguides 1450-1453 and 1460-1463 can be coaxial cables, optical fibers, line defects in photonic crystals, or any other medium suitable for simultaneously transmitting numerous, different frequency channels.

Figure 15A:
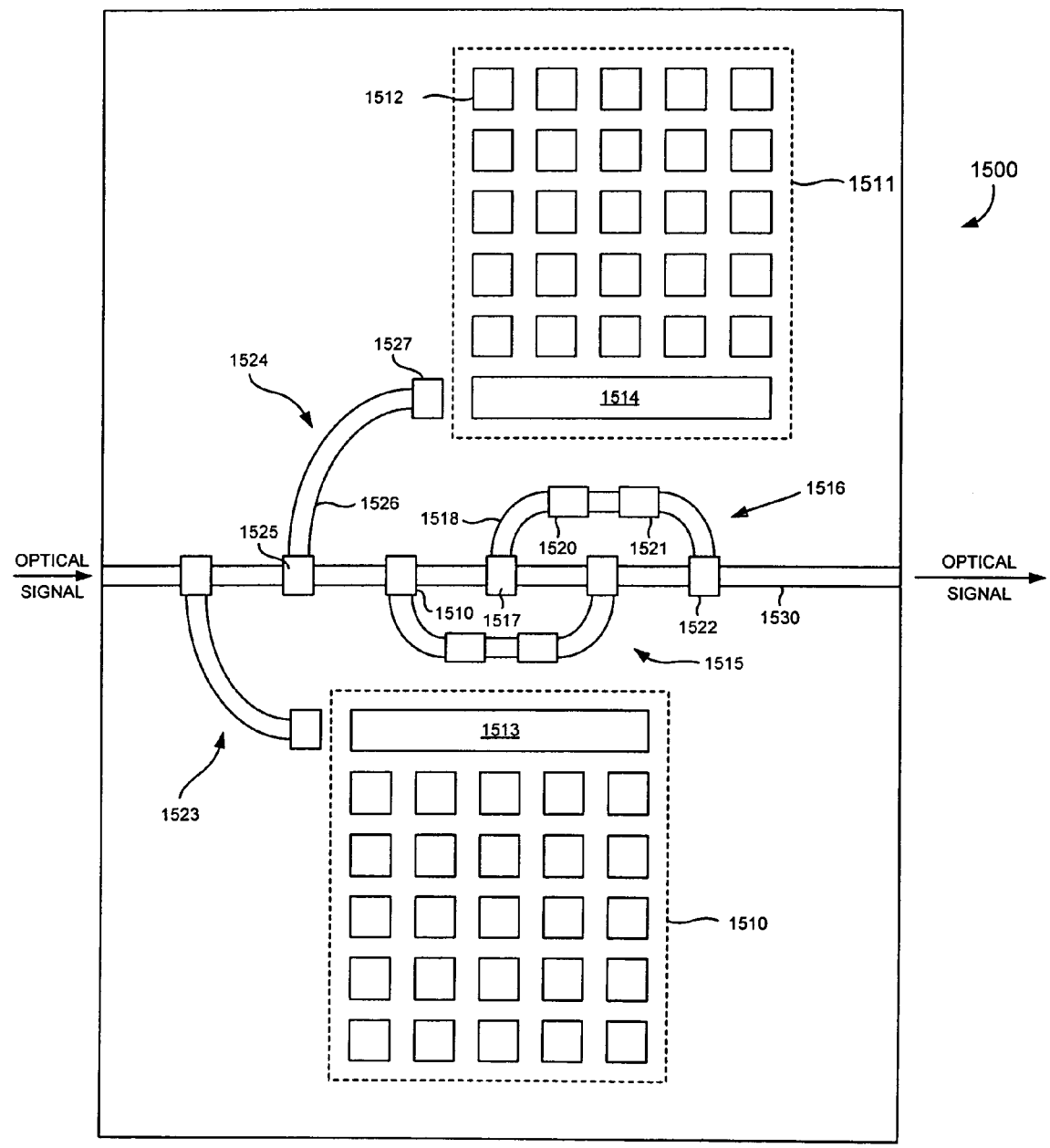
FIGS. 15A-15B illustrate photonic interconnections for transmitting data to and from mosaics of nanoelectronic tiles, each representing one of many possible embodiments of the present invention.
Figure 15B:
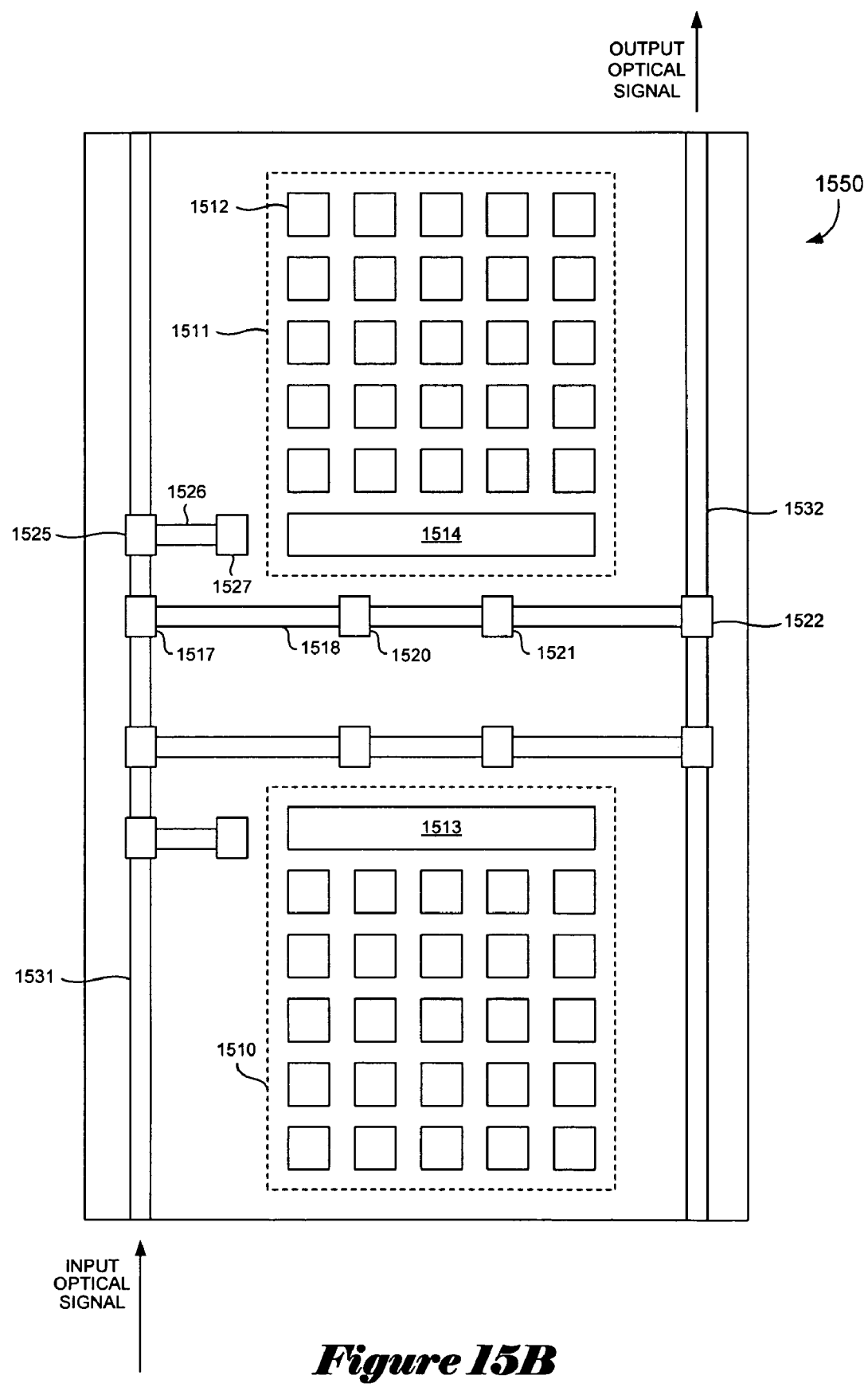

In alternate embodiments of the present invention, photonic interconnections can be used to carry data to and from mosaics composed of nanoelectronic tiles. FIGS. 15A-15B illustrate photonic interconnections for transmitting data to and from mosaics of nanoelectronic tiles, each representing one of many possible embodiments of the present invention. In FIG. 15A, IC 1500 includes mosaics 1510 and 1511, each mosaic is composed of an array of nanoelectronic tiles, such as nanoelectronic tile 1512, and interfaces 1513 and 1514. The nanoelectronic tiles of mosaics 1510 and 1511 can be any combination of memory, logic circuits, or sensors. Interfaces 1513 and 1514 are multiplexer/demultiplexers that transmit electrical signals between nanoelectronic tiles and photonic interconnections 1515 and 1516, respectively. Photonic interconnections 1515 and 1516 can be photonic crystals comprising drop filters, local waveguides, photodetectors, modulators, and add filters. For example, photonic interconnection 1516 is composed of drop filter 1517, local waveguide 1518, photodetector 1520, modulator 1521, and add filter 1522. Drop filters and add filters are wavelength-specific resonant cavities. Drop filters can extract and insert one or more frequency channels via evanescence carried by waveguide 1530. IC 1500 also includes photonic interconnections 1523 and 1524 for extracting a clock signal. For example, photonic interconnection 1523 is a photonic crystal comprised of drop filter 1525, local waveguide 1526, and photodetector 1527.

Waveguide 1530 receives an optical signal that encodes data directed to one or more nanoelectronic tiles of each mosaic. In an alternate embodiment, IC 1500 employs wavelength-division multiplexing ("WDM"), although other data multiplexing techniques might be used instead. (See e.g., R. Ramaswami and K. N. Sivarajan, "Optical Networks: A Practical Perspective," $2^{nd}$ Edition, Academic Press, 2002.) WDM divides an optical signal into "virtual fibers" or frequency channels that may be separately encoded.

The data and clock signals transmitted by waveguide 1530 are encoded in D different narrow-band coherent frequency channels of an optical signal. Each frequency channel is modulated over a bandwidth that is smaller than the frequency separation between adjacent frequency channels. A light source (not shown) may include one or more frequency mode-locked lasers that can be used to generate the optical signal. Of the D different frequency channels, d can encode optical clock signals, and D-d can encode data and mosaic addresses.

Photonic interconnections 1515 and 1516 extract frequency channels directed to corresponding mosaics 1510 and 1511 from waveguide 1530 and insert frequency channels into waveguide 1530. For example, drop filter 1517 extracts a specific frequency channel directed to mosaic 1511 and inserts the frequency channel into waveguide 1518. Photodetector 1520 detects the modulated frequency channel carried by local waveguide 1518 and generates an electrical signal that represents the data encoded in the extracted frequency channel. Interface 1514 converts the electrical signal into data and transmits the data to certain nanoelectronic tiles in mosaic 1511. Alternatively, interface 1514 can receive data encoded in electrical signals generated by the nanoelectronic tiles and passes the electrical signals to modulator 1521. Modulator 1521 encodes the data received by interface 1514 by modulating a frequency channel carried by the local waveguide 1518. Add filter 1522 inserts the modulated frequency channel into waveguide 1530.

Each mosaic is also connected to a photonic interconnection that extracts a frequency channel corresponding to an optical clock signal from waveguide 1530. For example, photonic interconnection 1524 uses drop filter 1525 to extract one of the d frequency channels corresponding to clock signals transmitted in waveguide 1530. Local waveguide 1526 then passes the extracted optical clock signal to photodetector 1527 which converts the optical clock signal into an electrical clock signal that can be transmitted by interface 1514 to synchronize the operation of the nanoelectronic tiles in mosaic 1511.

In certain embodiments of the present invention, a single clock signal can be used to synchronize the operation of each mosaic. As a result, in order to prevent most of the intensity contained in a frequency channel corresponding to the clock signal from being extracted by a single drop filter, drop filters can be fabricated to extract about 1% of the intensity contained in a frequency channel corresponding to the clock signal.

Interfaces 1513 and 1514 may use both a data stream and a separate clock stream to encode and distribute the input to the nanoelectronic tiles. For example, interfaces 1513 and 1514 can use an NRZ data stream and separate NRZ clock stream with a rising edge occurring in the middle of each NRZ data bit. In an alternate embodiment, Manchester encoding may be used to combine the clock and synchronous data into one serial data stream. Other encoding methods well known in the art can also be used to transmit serial data, such as Digital Phase Locked Loop ("DPLL"), which may consist of a serial shift register to receive digital input samples from photodetector 1521, a stable local clock signal advancing the shift register, and a phase adjustment circuit that creates a sampling clock in phase with the received data by slowly adjusting the phase of the sampled clock signal to match the received signal. The DPLL is typically used in Manchester encoding to separate and regenerate the clock signal from the data received.

A possibilty for IC 1500, shown in FIG. 15A, is back-scattering at add and drop filters. FIG. 15B illustrates an IC employing a second photonic interconnection representing one of many possible embodiments of the present invention. In FIG. 15B, IC 1550 includes an input waveguide 1531 that carries an input optical signal and is separate from an output waveguide 1532 that carries an output optical signal. The separate input and output waveguides 1531 and 1532 reduce the potential for optical signal backscattering. As in IC 1500, IC 1550 uses drop filters, such as drop filters 1517 and 1525, to extract frequency channels encoding optical data signals and optical clock signals carried by waveguides 1518 and 1526, respectively. IC 1550 includes photodetectors 1520 and 1527 that can measure the modulated frequency channels, and a modulator 1521 that can modulate a frequency channel to encode data for placement on waveguide 1518.

Figure 16:
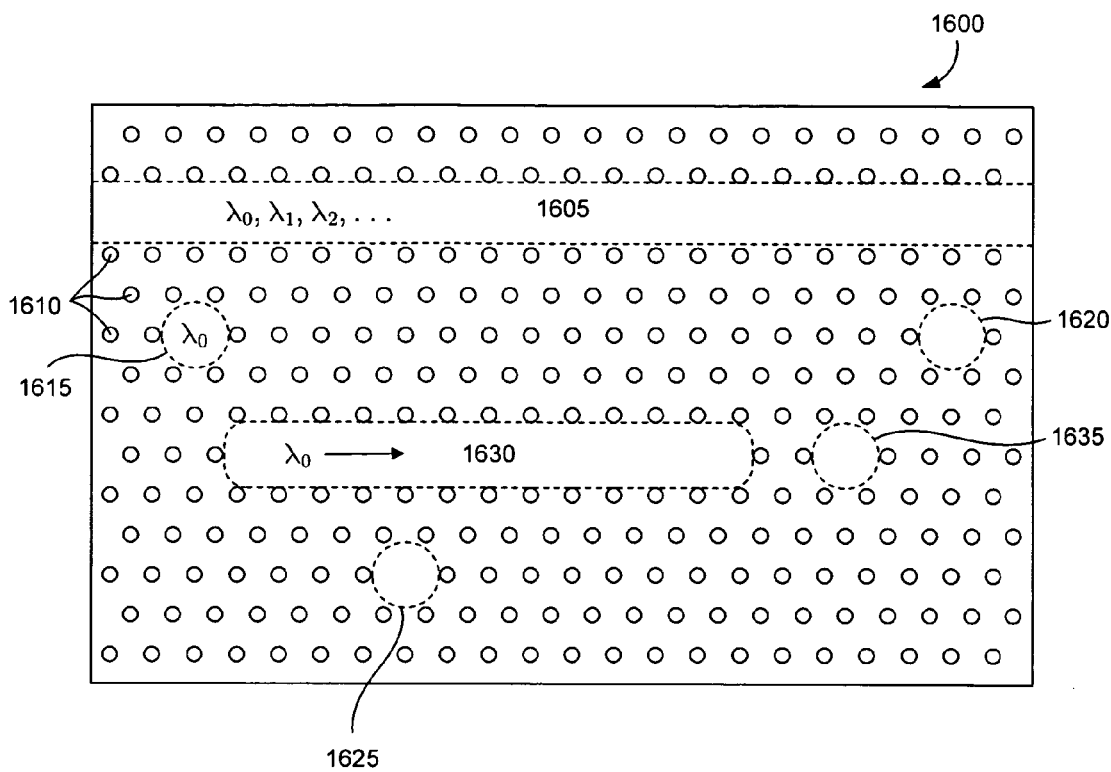
FIG. 16 illustrates an exemplary two-dimensional photonic crystal with resonant cavities and waveguides that can be used to implement the photonic interconnections shown in FIGS. 15A-15B that represents one of many possible embodiments of the present invention.

FIG. 16 illustrates an exemplary two-dimensional photonic crystal with resonant cavities and waveguides that can be used to implement the photonic interconnections shown in FIGS. 15A-15B that represents one of many possible embodiments of the present invention. Photonic crystal 1600 contains a waveguide 1605 located within a lattice of cylindrical columns, such as cylindrical columns 1610. The cylindrical columns can be air holes or holes filled with a dielectric material different from the dielectric material of the photonic crystal slab. The diameter and pattern of cylindrical columns 1610, and the dielectric material in or surrounding cylindrical columns 1610, can be selected to create photonic bandgaps that confine photons having certain wavelengths to waveguide 1605. Two-dimensional photonic crystal interconnections typically have cylindrical column diameters and separations on the order of a few hundred nanometers or less.

In photonic crystal 1600, drop and add filters are implemented using resonant cavities that lie within a range of evanescent fields emanating from waveguide 1605. Both the diameter as well as the distance of the resonant cavities from the waveguide are selected to enable the resonant cavity to act as a resonator for a specific wavelength carried by waveguide 1605. The dielectric constant of the material in the lattice of cylindrical columns, and the spacing and/or size of the lattice of cylindrical columns can be selected during photonic crystal fabrication so that a resonant cavity can extract and hold light with a particular wavelength from a waveguide or insert light with a particular wavelength into a waveguide. For example, in FIG. 16, drop filter 1615 is a resonant cavity that can be used to extract light with wavelength $\lambda_0$ from waveguide 1605, and add filter 1620 is a resonant cavity that can be used to insert light of wavelength $\lambda_1$ into waveguide 1605.

To provide strong couplings with waveguide 1605, drop filter 1615 and add filter 1620 have a high Q factor, such as a Q factor of 1,000 or more. The Q factor of a resonant cavity can be modeled using finite-difference, time-domain numerical methods, as described by K. Srinivasan and 0. Painter, "Fourier space design of high-Q factor cavities in standard and compressed hexagonal lattice photonic crystals," Optics Express 11, 579 (2003).

The resonant transmission bandwidth of a resonant cavity with a Q factor, $Q_0$ and resonant frequency $\upsilon_0$ ($\upsilon=\omega/2\pi$) is $\pi\upsilon_0/Q_0$ or about 500 THz/Q for light with a wavelength of 1-μm. The resonant intensity transmission fraction is 1-1/Q, and the non-resonant insertion loss of a resonant cavity is 1/Q, assuming a configuration similar to that shown in FIG. 16, where non-resonant light can propagate freely along a waveguide, such as waveguide 1605. Generally, the frequency $\upsilon_0$ and modulation bandwidth B for a frequency channel have a resonant transmission bandwidth $\pi\upsilon_0/Q$ that is greater than the modulation bandwidth B. For example, the fraction 1-1/Q of the light in the frequency channel at wavelength $\lambda_0$ that is redirected and transmitted through a resonant cavity, such as the resonant cavity of drop filter 1615, is identical to the fraction of the light at other wavelengths $\lambda_1, \lambda_2, \ldots$ that continue to propagate along waveguide 1605. As a result, the number of photonic interconnections, such as drop and add filter pairs, can be restricted to less than Q/2 to reduce the total non-resonant signal loss, $1-(1-1/Q)^Q$, from a waveguide. For example, the total non-resonant signal loss of a waveguide, such as waveguide 1530 shown in FIG. 15A, is less than 63%. As a result, the last drop and add filter pairs on waveguide 1503 can extract at least 37% of the light originally entering waveguide 1530 at the corresponding wavelength of the pair.

Local waveguide 1630 is positioned close to drop filter 1615 so that a large fraction (1-1/Q) of the intensity coupled into drop filter 1615 propagates through local waveguide 1630. Photodetector 1520 and modulator 1521, shown in FIGS. 15A-15B, can be implemented using resonant cavities 1625 and 1630, respectively. Photodetector 1625 is sized and positioned to capture photons from local waveguide 1630. Modulator 1635 is also sized and positioned to create a strong resonant coupling to add filter 1620, so that add filter 1620 can insert a frequency channel modulated by modulator 1635 into waveguide 1605.

The photonic interconnection shown in FIG. 16 can be repeated for each mosaic, such as photonic interconnections 1515 and 1516 shown in FIG. 15A. For each photonic interconnection, resonant frequencies of the drop and add filters corresponding to a first photonic interconnection are different from the resonant frequencies of the drop and add filters of a second photonic interconnection, so that each mosaic receives a different frequency channel. For example, in FIG. 15A, the resonant frequencies corresponding to drop filter 1517 and drop filter 1540 are different so that frequency channels intended for mosaic 1510 are not extracted by drop filter 1517. Such differences can be achieved by varying dimensions of the resonant cavities or by varying the chemical properties of photonic crystal 1600 in the different photonic interconnection regions. For example, the cylindrical column diameter in the photonic crystal can vary or the dielectric composition of the photonic crystal slab can vary along waveguide 1530, shown in FIG. 15A.

Figure 17A:
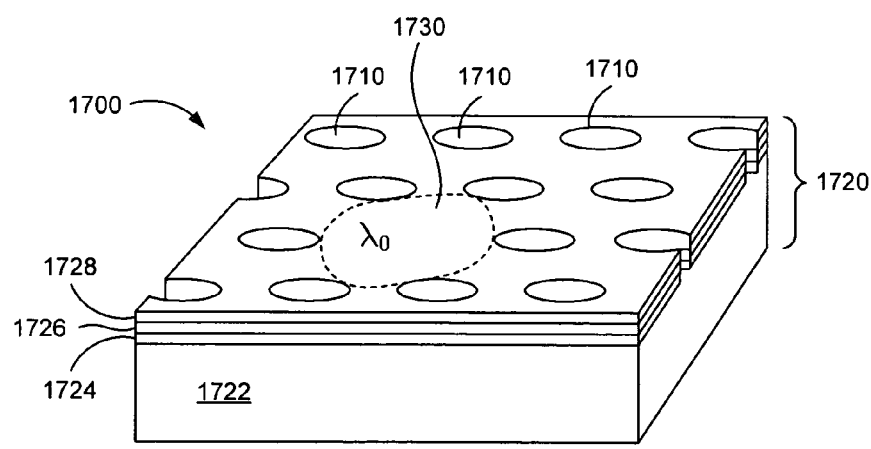
FIG. 17A illustrates a resonant cavity that can be used as either a drop filter or an add filter in a photonic crystal and represents one of many possible embodiments of the present invention.

Drop filter 1615, drop filter 1620, photodetector 1625, and modulator 1635 can be fabricated in photonic crystal 1600 from a variety of different materials. FIG. 17A illustrates a resonant cavity that can be used as a drop filter or an add filter in a photonic crystal and represents one of many possible embodiments of the present invention. In FIG. 17A, resonant cavity 1730 is created by selectively removing a cylindrical column in slab 1720. The pattern of cylindrical columns 1710 surrounding resonant cavity 1730 effectively prohibit light resonating in resonant cavity 1730 from escaping. As described above for drop filter 1615 and add filter 1620, the size, position, and material in and around resonant cavity 1730 can be selected to create a high-Q factor to retain a wavelength $\lambda_0$.

Resonant cavity 1730 can be fabricated using a cylindrical column having a diameter different from the surrounding cylindrical columns 1710, and filled with a dielectric material different from the dielectric of the surrounding cylindrical columns 1710. Slab 1720 can be fabricated using a first semiconductor layer 1724 on glass substrate 1722, an insulating layer 1726 on the first semiconductor layer 1724, and a second semiconductor layer 1728 on insulating layer 1726. Semiconductor layers 1724 and 1728 may have different dopant concentrations or dopant types so that the structure can operate as a photodetector, as described below with reference to FIG. 17B. Layers 1728, 1726, and 1724 comprise a single layer referred to as the "p-i-n" layer. The thicknesses and dopant concentrations of the p-i-n layers can be any combination of Si, SiO, $SiO_2$, or InGaAs.

Figure 17B:
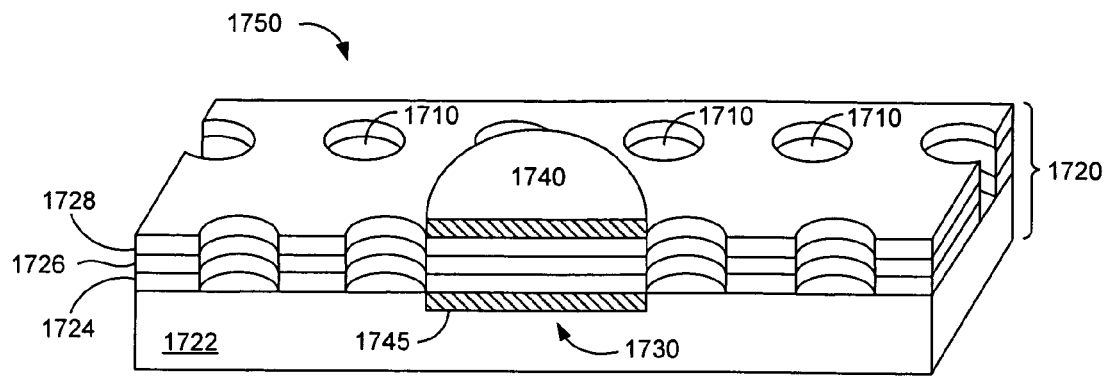
FIG. 17B illustrates a photodetector in a photonic crystal that represents one of many possible embodiments of the present invention.

FIG. 17B illustrates a photodetector in a photonic crystal that represents one of many possible embodiments of the present invention. Photodetector 1750 is fabricated using a resonant cavity, such as resonant cavity 1730 described above with reference to FIG. 17A, sandwiched between electrodes 1740 and 1745. Electrode 1745 is in contact with semiconductor layer 1724, and electrode 1740 is in contact with semiconductor layer 1728. Electrodes 1740 and 1745 collect a current that depends on the intensity of light resonating in resonant cavity 1730. Electrodes 1740 and 1745 can be electrically connected to a circuit unit, such as interface 1714 described above with reference to FIGS. 15A-15B, to transmit the electrical signals that correspond to the optical signal resonating in resonant cavity 1730 to an interface.

Photodetector 1750 can also be used as a modulator connected to a mosaic interface, such as modulator 1521 connected to interface 1514 described above with reference to FIG. 15A. A change in an applied voltage between electrodes 1740 and 1745 changes the dielectric constant of the material in resonant cavity 1730. As a result, the phase and/or amplitude of the frequency channel resonating in resonant cavity 1730 changes. The electrically controllable phase change can be used for frequency modulation or amplitude modulation of the optical signal resonating in resonant cavity 1730.

Figure 17C:
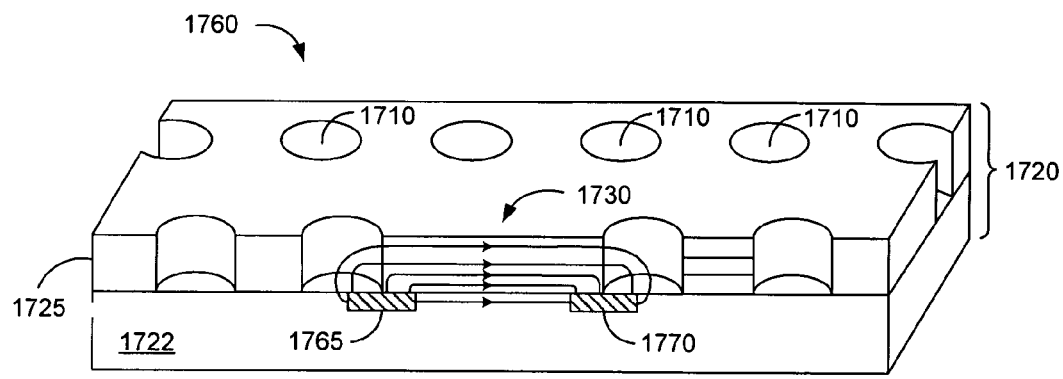
FIG. 17C illustrates a modulator in a photonic crystal that represents one of many possible embodiments of the present invention.

FIG. 17C illustrates a modulator in a photonic crystal, such as modulator 1521 shown in FIG. 15A, that represents one of many possible embodiments of the present invention. Modulator 1760 includes resonant cavity 1730, located in layer 1725, and electrodes 1765 and 1770 that are both located under resonant cavity 1730 and separated from each other. Layer 1725 can be composed of the p-i-n layers, described above with reference to FIG. 17A, or a single layer of lithium niobate, $LiNbO_3$. A voltage applied across electrodes 1765 and 1770 creates an electric field that changes the dielectric constant in the resonant cavity causing a phase and/or amplitude change in the frequency channel resonating in resonant cavity 1730. Variations of the applied voltage between electrodes 1765 and 1770 can be used for amplitude or frequency modulation of the optical signal.

Photodetector 1750, shown in FIG. 17B, and modulator 1760, shown in FIG. 17C, can be modified to improve the design for an integrated photonic crystal. For example, the intrinsic capacitance of a silicon photodetector with an area of A square microns is approximately 0.1 A fF, while the transverse dimension of the photodetector shown in FIG. 17B is about 100 to 150 nm. Accordingly, the intrinsic capacitance of a doped region forming a photodetector, such as photodetector 1750, is about 2 aF. The intrinsic capacitance is low enough that current fluctuations due to the noise generated by thermal agitation of electrons in a conductor, referred to as "Johnson noise," may be insignificant. Hence, the statistics of the light source dominate the bit error rate ("BER") arising in the serial digital signal corresponding to the output from the photodetector. For example, a Poisson distribution with 30 photons per bit is sufficient to achieve a BER less than 10-13. The small size of the detector further implies that the fraction of the light absorbed by the active area of the detector is small. Incorporating the doped region into a resonant cavity with a Q factor of 10 to 100 can compensate for the reduced absorption. M. K. Emsley, O. Dosunmu, and M. Selim Unlu, "High-Speed Resonant-Cavity-Enhanced Silicon Photodetectors on Reflecting Silicon-On-Insulator Substrates," IEEE Photonics Technology Letters 14, 519, (2002) indicate that such a resonant cavity enhancement method can increase the efficiency of broadband silicon photodetectors. With an appropriate choice of Q factor to impedance-match, the optical input losses of the cavity to the internal absorption loss of the detector may increase the detection efficiency. For example, an increase in the detection efficiency of about 50% may be achievable.

Similar considerations can be applied to the design of a resonant cavity enhanced ("RCE") modulator; using electro-optic techniques, modulation depths as high as 50% can be obtained if the resonator corresponding to the modulator has a Q factor greater than about 1,000. Although other physical effects can be employed, such as variations in the free carrier plasma index, electro-optic modulation can be used with a potential difference of about 30 mV applied across a gap of about 300 nm to produce an electric field of 1 kV/cm, which is sufficient to generate a refractive index change as large as 0.001 in a wide variety of linear dielectric materials.

The area of the photonic interconnection assemblies shown in FIGS. 17A-17C and the area of the interface, such as interface 1514 shown in FIG. 15, may limit the level of integration that can be achieved, because the photonic crystal components shown in FIG. 16 are generally irreducible in size given a specific set of wavelengths used in the optical signal. However, an interface, such as interface 1514, can be reduced in size by using the nanoelectronic equivalents of conventional transistors, buffers, and other logic elements. The resulting nanoelectronic equivalent interface serves the same function as a conventional interface implementation. For example, in FIG. 15, interface 1514 can be fabricated on the nanoelectronic scale to convert binary bits streams supplied by photodetector 1520 to parallel bit streams used by molecular tiles, such as nanoelectronic tile 1512, and convert parallel bit streams generated by molecular tiles into serial bit streams appropriate for modulator 1521. Published Hewlett-Packard U.S. Patent Application No. 20040041617, filed Aug. 30, 2002, entitled "Configurable Molecular Switch Array" by Gregory S. Snider, Philip J. Kuekes, and R. Stanley Williams provides a further description of molecular logic that may be used to fabricate a nanoelectronic interface.

Figure 18:
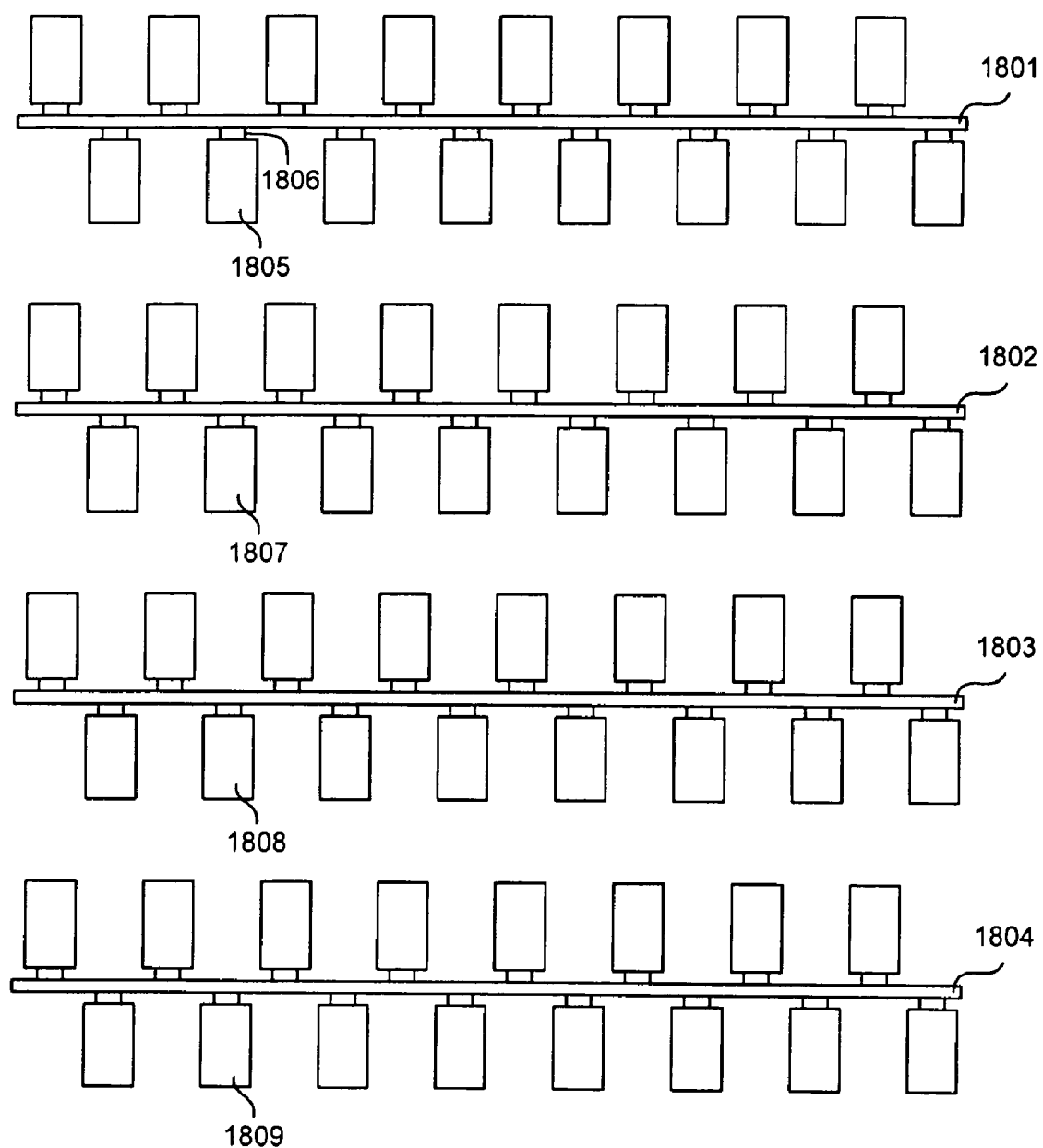
FIG. 18 illustrates a photonic interconnection architecture having four waveguides that represents one embodiment of the present invention

The photonic architectures described above with reference to FIGS. 15A-15B can be scaled up by increasing the number of waveguides and mosaics. A scaled-up photonic architecture can have NK mosaics, where K is the number waveguides and N is the number mosaics connected to each waveguide. Each waveguide can be connected to an optical signal source that transmits the same optical signal comprising a number of independent frequency channels to all mosaics. For example, FIG. 18 illustrates a photonic interconnection architecture having four waveguides 1801-1804, that represents one embodiment of the present invention. Each waveguide is connected to 16 mosaics, such as mosaic 1805. The waveguides are connected to the mosaics via photonic interconnections, such as photonic interconnection 1806.

In order to direct data to each mosaic, the optical signal is composed of NK or more different frequency channels, each frequency channel encoding data intended for a specific mosaic. In one embodiment of the present invention, the nth mosaic connected to each waveguide extracts a different frequency channel with the same wavelength $\lambda_n$. In order to encode data for the K different nth mosaics, K frequency channels with wavelength $\lambda_n$ are each modulated differently in order to provide K different frequency channels with wavelength $\lambda_n$. For example, mosaics 1805 and 1807-1809 are the $4^{th}$ mosaics on waveguides 1801-1804, respectively. An optical signal transmitted on waveguides 1801-1804 includes four differently modulate frequency channels with wavelength $\lambda_4$ so that mosaics 1805 and 1807-1809 can each extract only one of the four differently modulate frequency channels. If a given mosaic can support a maximum data input/output rate B, the modulation bandwidth that can be applied to each frequency channel is at least KB, and the transmission window of the drop/add filter interconnections satisfies $\pi v_0/Q > KB$, then the total frequency bandwidth of the photonic architecture is NKB. As a result, all mosaics can be accessed in parallel without foreknowledge of the physical location of any mosaic. Additional multiplexing is achieved by simply adding mosaics to each waveguide.

With a BER overhead of 10× to compensate for unanticipated losses in a practical photonic interconnection, and operation at a full throughput of 1 Tb/s at a wavelength of approximately 11m, the minimum intensity needed is 60 µW. With a RCE detection efficiency of 50%, and 1024 waveguides supplied by a 10-stage binary splitter system with a total insertion loss of $\log_2(1024) \times 0.1$ dB or 1 dB, each with a non-resonant insertion loss of 63%, the entire photonic interconnection needs 420 mW of input optical intensity. Even at this intensity, cross-phase modulation is weak enough to neglect over centimeter-scale distances.

Figure 19:
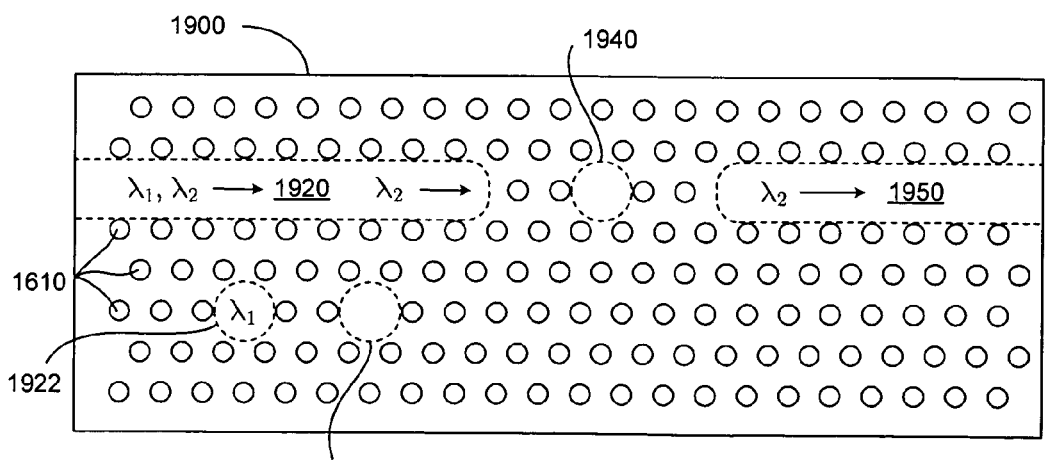
FIG. 19 illustrates a photonic crystal having a waveguide for transmitting an input frequency channel and a waveguide for transmitting an output frequency channel and represents one of many possible embodiments of the present invention.

Although embodiments of the invention described above provide input/output for circuits containing multiple mosaics of nanoelectronic tiles, the capacitance of metal interconnections interconnecting a single mosaic to other distant electronic components may also significantly slow the operating speed of the mosaic. FIG. 19 illustrates a photonic crystal having a waveguide for transmitting an input frequency channel and a waveguide for transmitting an output frequency channel and represents one of many possible embodiments of the present invention. In FIG. 19, photonic interconnection 1900 accommodates an optical signal having two frequency channels in the WDM scheme. An input frequency channel with a wavelength $\lambda_1$ is used for input signals, and an output frequency channel with wavelength 22 is used for output signals. Photonic crystal 1900 comprises a waveguide 1920 acting as an input waveguide. Drop filter 1922 is a resonant cavity that selectively extracts the input frequency channel. Drop filter 1922 creates a strongly coupled resonance having a Q factor greater than about 1,000. A photodetector 1930, described above with reference to FIGS. 16 and 17B, is fabricated near drop filter 1922. Photodetector 1930 creates a resonator for the input frequency channel with a Q factor of about 10 to 100. Electric leads (not shown) located at photodetector 1930 transmit an electrical signal equivalent to the data encoded in the input frequency channel to an electronic interface, such as interface 1514 shown in FIG. 15A, for a mosaic. After extraction and photodetection, any intensity loss associated with the input frequency channel is acceptable, because the input frequency channel is used only to carry input data.

The output frequency channel with wavelength $\lambda_2$ is unmodulated when input in waveguide 1920, and is sufficiently distinct from the input frequency channel that the output frequency channel can pass drop filter 1922 with little intensity loss. Accordingly, modulator 1940 includes a resonant cavity, as described above with reference to FIGS. 6B and 6C, to selectively extract the output frequency channel. Electric leads (not shown) connect the electronic interface of the mosaic to the electrodes (not shown) of modulator 1940. In order to encode output data in the output frequency channel, a base voltage is applied to the electrodes of modulator 1940 to create a resonator having a high Q factor. The Q factor for resonant cavity 1940 rapidly changes with changes in the applied voltage as described above, permitting the output frequency channel to be modulated as needed to encode output data. The output frequency channel can then evanesce into, and be transmitted by, waveguide 1950.

Figure 20:
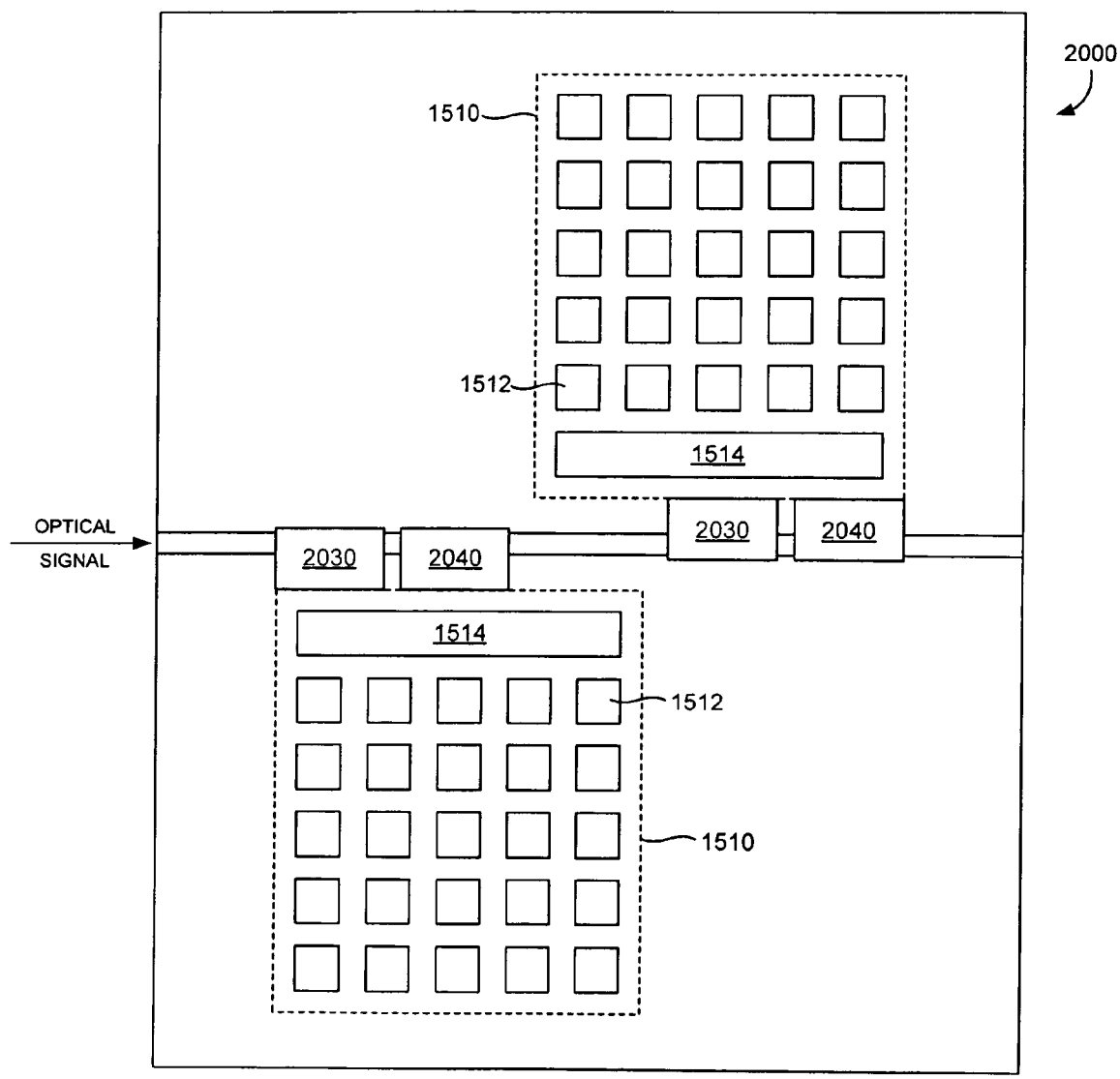
FIG. 20 illustrates an integrated circuit that employs non-demolition photodetectors and represents one of many possible embodiments of the present invention.

In an alternate embodiment of the present invention, the photonic interconnections described above with reference to FIG. 15A-15B can be replaced by directly integrating photodetectors and modulators into waveguide 1530. FIG. 20 illustrates an IC 2000 that employs detectors that can detect single photons of a particular wavelength without destroying the photons so that the photons can be reused if needed. The detectors are referred to as "non-demolition detectors." In device 2000, detectors 2030 and modulators 2040 are roughly molecular in size and integrated directly into waveguides 2020. Detectors 2030 may be non-demolition detectors that minimize insertion loss.

Figure 21:
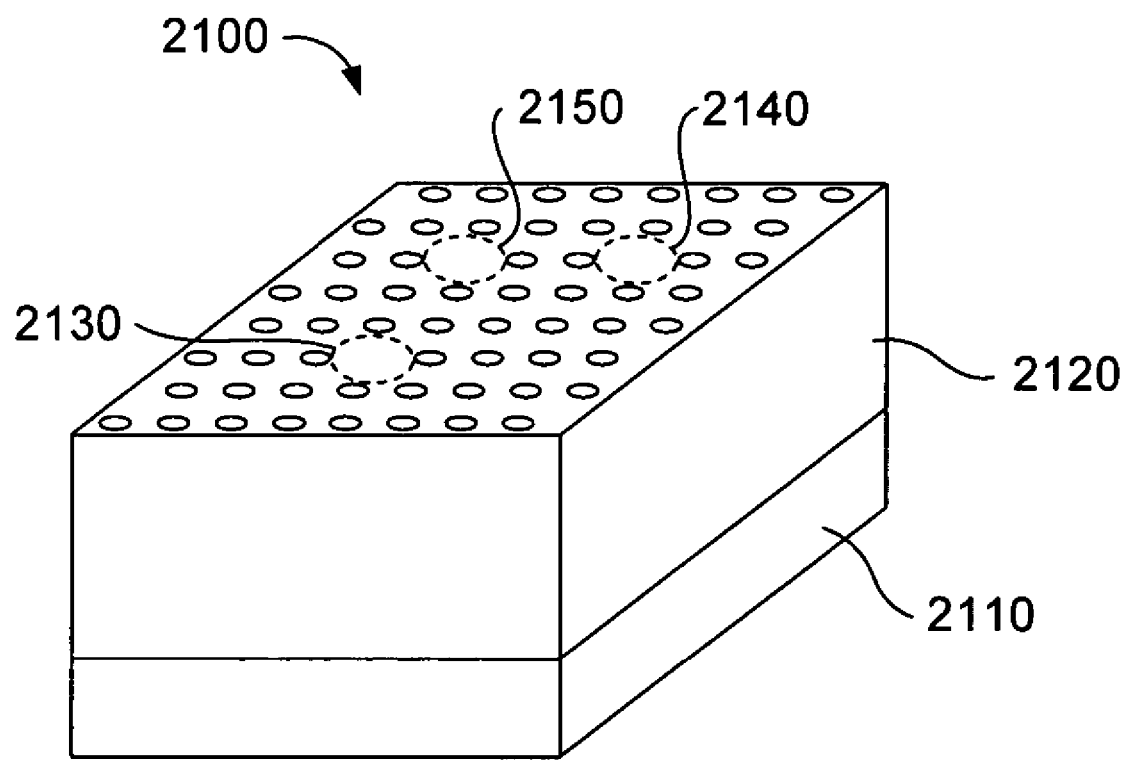
FIG. 21 illustrates an exemplary photonic interconnection attached to a multi-component integrated nanoelectronic circuit that represents one of many possible embodiments of the present invention.

In an alternate embodiment of the present invention, a photonic interconnection can be applied to communicate with a molecular circuit, such as a mosaic, nanoelectronic tile, or a micron scale autonomous molecular device, such as a sensor. A three dimensional photonic crystal can be positioned above a nanoelectronic circuit and used to convert optical signals into electrical signals. Because the three-dimensional photonic crystal is located above the nanoelectronic circuit, the electrical signals can be passed directly to components of the nanoelectronic circuit below. FIG. 21 illustrates an exemplary photonic interconnection comprising a three-dimensional photonic crystal located above a multi-component integrated nanoelectronic circuit that represents one of many possible embodiments of the present invention. In FIG. 21, the top surface of nanoelectronic circuit 2110 is attached to the bottom surface of a three-dimensional photonic crystal 2120. Photonic crystal 2120 includes three embedded resonant cavities 2130, 2140, and 2150. Resonant cavity 2130 can be configured as an RCE photodetector, such as photodetector 1750 described above with reference to FIG. 17B. Resonant cavity 2140 can be configured as a modulator, such as modulator 1750 described above with reference to FIG. 17B and modulator 1760 described above with reference to FIG. 17C. Note that RCE photodetector 2130 provides an input interface, and RCE modulator 2140 provides an output interface. Resonant cavity 2150 can be configured as an RCE photodetector for receiving and converting optical clock signals into electrical clock signals that can be passed directly to nanoelectronic circuit 2110.

IC 2100 can be operated with a remote two-wavelength laser (not shown) to generate a first frequency channel and a second frequency channel. The first frequency channel can be used to encode data for detection by the photodetector at resonant cavity 2130. The modulator at resonant cavity 2140 can encode output data in the second frequency channel. The photonic crystal can reflect the modulated output frequency channel back toward the remote two-wavelength laser, where any output direction that is different from the direction of the input optical signal is sufficient to permit detection of the output frequency channel from IC 2100.

The interface between nanoelectronic circuit 2110 and resonant cavities 2130, 2140, and 2150 can be molecular in dimensions. For example, a DPLL circuit, described above with reference to FIG. 15A, can be implemented using molecular electronic components as described in the following Hewlett Packard patents: U.S. Pat. No. 6,459,095, "Chemically Synthesized and Assembled Electronic Devices," issued Oct. 1, 2002; U.S. Pat. No. 6,314,019, "Molecular Wire Crossbar Interconnection for Signal Routing and Communications," issued Nov. 6, 2001; application Ser. No. 09/280,045, "Molecular Wire Crossbar Logic," filed Mar. 29, 1999; U.S. Pat. No. 6,128,214, "Molecular Wire Crossbar Memory," issued Oct. 3, 2000; and U.S. Pat. No. 6,256,767, "Demultiplexer for a Molecular Wire Crossbar Network," issued Jul. 3, 2001.

Although the present invention has been described in terms of particular embodiments, it is not intended that the invention be limited to these embodiments. Modifications within the spirit of the invention are be apparent to those skilled in the art. For example, in an alternate embodiment of the present invention, the photonic interconnection signaling systems can instead be employed to implement quantum systems that manipulate quantum states, such as qubits, qudits, or qunits. One such application has the same architecture as the architecture described above with reference to FIGS. 15A-15B, but nanoelectronic tiles 1512 manipulate quantum states, and interface 1514 distribute classical signals to all of the nanoelectronic tiles 1512 in the array in parallel for parallel manipulation of quantum states in all or a number of nanoelectronic tiles 1512. In an alternate embodiment of the present invention, the optical signals on waveguide 1530, shown in FIG. 15A, represent quantum information, and interface 1514 either routes the selected optical signals to nanoelectronic tiles, such as nanoelectronic tile 1512, or converts the optical signals into a form suitable for the nanoelectronic tiles.

The architecture of FIG. 15A has several advantages for use in quantum information processing. For example, an IC 1500 having sub-micron feature sizes is relatively easy to cool to low temperatures, such as near absolute zero. In addition, IC 1500 does not require connected wires for signaling. As a result, the noise generated by thermal agitation of electrons in a conductor, such as Johnson noise, can be avoided, and a significant source of heat injection can be eliminated. As a result, IC 1500 can be maintained at low temperatures to reduce decoherence that can interrupt quantum processing.

One specific application of the architectures described above with reference to FIG. 15 is quantum information processing using optical pulse control of electron-spin-based semiconductor quantum computers. (See Pazy et al, "Europhys Lett." 62, 175-181, 2003.) In semiconductor quantum computers, each qubit can be represented by a spin state of a single electron or a quantum dot. A quantum dot represents the presence or absence of a single electron. A quantum dot can be created using any substance, such as a semiconductor, a metal, an atom, or a molecule, that allows for detection of a single electron. Single-qubit and two-qubit logical operations are implemented by applying classical optical control pulses to particular quantum dots. Semiconductor quantum computers combine quantum optics and spintronics, which includes very precise control provided by lasers, the availability of resonance-fluorescence measurements, and the long spin coherence times of electrons in semiconductors. An application of the architecture of FIG. 15A to an electron-spin-based semiconductor quantum computer can send a laser control pulse, such as a classical signal, that a drop-filter 1517 extracts for application to a target quantum dot, represented by nanoelectronic tile 1512. As a result, the target quantum dot 1512 can perform a logic operation on the qubit, or between the qubit and a qubit in a neighboring quantum dot. Another application sends a driving laser pulse to a particular quantum dot to perform a resonance-fluorescence measurement for qubit readout.

For an electron-spin-based semiconductor quantum computer, complications may arise from the necessity of using different wavelengths for different classical information channels. The frequency of the light used generally corresponds to quantum state transitions. For example, a resonant optical frequency of each qubit may be tuned to the same value as that of the local drop/add filter pair, which can be accomplished by changing the physical dimensions of the resonator encapsulating each qubit or quantum dot. Alternatively, a nanoscopic nonlinear frequency conversion process, such as electromagnetically induced transparency, may be employed in interface 1514 to convert the incoming frequency to a frequency in all quantum dots in the system, such as quantum dot 1512. In an alternate embodiment, a light source, such as a quantum dot laser, that is electrically driven and local to each quantum dot can be fabricated. In this case, the architecture is nearly identical to the classical system described above in FIGS. 15A-15B, except that each local modulator 1521 for a collection of classical logic gates is replaced with a local driving laser for each quantum gate. As a result, the advantage of driving many gates with the same drop/add filter pair provides a high degree of scaling.

A technique for applying classical control signals to an array of quantum bits can also be used to implement so-called quantum cellular automata quantum computing. (See e.g., S. Lloyd, Science 261, 1569 (1993), and S. Benjamin, "Phys. Rev. Lett.," 88, 017104 (2002)). Here an array of qubits, the simplest form of which is a linear array of two of qubit, such as ABABAB, but higher dimensional arrays of more species of qubit can be used can be globally addressed with external classical signals to effect universal quantum information processing.

An output/read method used for reading classical memory described above can also be used to read quantum memory by performing projective quantum measurements. The method can be used as the final output read stage of a quantum computer to turn the output register of such a quantum processor into a final classical output.

The performance of projective quantum measurements on select qubits in a quantum array can also be used to implement a quantum circuit model of quantum computation (See e.g., R. Raussendorf and H. J. Briegel, Phys. Rev. Lett. 80, 5188 (2001)), whereby an initial cluster state of the qubit array is prepared and the rest of the computation is effected through sequences of projective quantum measurements applied to subsets of the array.

Quantum-coherent transmission of quantum information around a photonic crystal structure may be very useful in scaling a quantum computer. Using this approach, any quantum state can interact with any other quantum state in the quantum device, by exchanging photonic quantum information. Error thresholds on the communication may be lowered considerably (See e.g., "Phys. Rev. Lett.," 90, 067901(2003)). Provided that very accurate control of qubits within small mosaics of approximately 5 qubits is available—the communication between qubits can be quite noisy. For example, an error rates can be as high ⅔. As a result, the photonic architecture supporting a quantum computer may be able handle small, inherent, off-resonant losses in a photonic crystal multiplexer.

Once an architecture has been chosen for a classically controlled quantum computer, the same physical apparatus can be used to implement a classical computer or hybrid classical/quantum computer. A classical bit can be represented by a qubit, provided the qubit is one of two states, for example, in either a |0> or |1> state at the end of each logic operation. For example, using local lasers to manipulate qubits allows quantum computing resources to store classical information.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A photonic interconnection for interconnecting and synchronizing operation of components within a computing device comprising:
    an optical transmission path for transmitting a number of independent frequency channels within an optical signal provided by an optical signal source;
    one or more filter resonant cavities of a photonic crystal located near the optical transmission path, each filter resonant cavity extracting one of one or more specific frequency channels transmitted by the optical transmission path via evanescent coupling, the frequency channels including one or more frequency channels carrying a clock signal; and
    one or more photodetector resonant cavities of the photonic crystal, wherein each photodetector resonant cavity is positioned adjacent to one of the one or more filter resonant cavities and includes two electrodes in order to extract specific frequency channels from the adjacent filter resonant cavities via evanescent coupling and convert the extracted frequency channels into electrical signals for use by one or more components of the computing device, the electrical signals including one or more clock signals for synchronizing operation of the one or more components.

2. The photonic interconnection of claim 1 wherein the one or more frequency channels further comprises one or more frequency channels encoding clock signals and one or more frequency channels encoding data signals.

3. The photonic interconnection of claim 1 wherein the photonic interconnection further comprises a two-dimensional photonic crystal.

4. The photonic interconnection of claim 3 wherein the two-dimensional photonic crystal further comprises a slab composed of a first dielectric and one or more cylindrical columns contained within the slab composed of a second dielectric.

5. The photonic interconnection of claim 1 wherein the photonic interconnection further comprises a three-dimensional photonic crystal.

6. The photonic interconnection of claim 5 wherein the three-dimensional photonic crystal further comprises a slab composed of a first dielectric and one or more spheres and tubes contained within the slab composed of a second dielectric.

7. The photonic interconnection of claim 1 wherein the optical transmission path further comprises a waveguide in a photonic crystal.

8. The photonic interconnection of claim 1 wherein the filter resonant cavity further comprises a resonant cavity in a photonic crystal.

9. The photonic interconnection of claim 1 wherein the photodetector resonant cavity further comprises a resonant cavity in a photonic crystal sandwiched between two electrodes.

10. The photonic interconnection of claim 1 wherein the computing device further comprises a mosaic of molecular electronic circuits.

11. The photonic interconnection of claim 10 wherein the molecular electronic circuit further comprises any one of memory, a logic circuit, or a sensor.

12. The photonic interconnection of claim 10 wherein the molecular electronic circuit further comprises any one of a device for embodying quantum information or a quantum dot.

13. The photonic interconnection of claim 1 wherein the computing device further comprises any one of a circuit unit, a processing unit, or memory.

14. A method for synchronizing components of a computational device, the method comprising:
    transmitting an optical clock signal provided by an optical source in an waveguide;
    extracting the optical clock signal from the waveguide with a filter resonant cavity of a photonic crystal located near the waveguide;
    extracting the optical clock signal from the filter resonant cavity via a photodetector resonant cavity including two electrodes, the photodetector resonant cavity located near the filter resonant cavity;
    converting the extracted optical clock signal into an electrical clock signal via the electrodes of the photodetector resonant cavity; and
    transmitting the electrical clock signal from the photodetector resonant cavity to one or more components of the computational device.

15. The method of claim 14 wherein the computational device further comprises one or more of a processing unit, a circuit unit, or a mosaic of nanoelectronic tiles.

16. The method of claim 15 wherein the mosaic further comprises a device for embodying quantum information or a quantum dot.

17. The method of claim 14 wherein the optical clock signal further comprises one or more modulated frequency channels in an optical signal.

18. The method of claim 14 wherein the waveguide further comprises one or more of a coaxial cable, an optical fiber, or a linear defect in a photonic crystal.

19. The method of claim 14 wherein the photodetector further comprises:
    a resonant cavity;
    an upper electrode; and
    a lower electrode.

20. The method of claim 14 wherein extracting the optical clock signal further comprises evanescent transfer of a fraction of the optical clock signal to the filter resonant cavity.

21. The method of claim 14 further comprises a local optical transmission path for transmitting the extracted optical clock signal from the filter resonant cavity to the photodetector resonant cavity.

22. The method of claim 14 wherein converting the extracted optical clock signal into an electrical clock signal further comprises detecting a current that depends on intensity of light resonant in the photodetector resonant cavity.

* * * * *

UNITED STATES PATENT AND TRADEMARK OFFICE
CERTIFICATE OF CORRECTION

PATENT NO. : 7,359,587 B2  Page 1 of 1
APPLICATION NO. : 11/264210
DATED : April 15, 2008
INVENTOR(S) : Ray Beausoleil et al.

It is certified that error appears in the above-identified patent and that said Letters Patent is hereby corrected as shown below:

In column 8, line 19, delete "F," and insert -- $\Gamma$, --, therefor.

Signed and Sealed this

Fourteenth Day of July, 2009

JOHN DOLL
*Acting Director of the United States Patent and Trademark Office*